US006799959B1

(12) United States Patent
Tochimoto et al.

(10) Patent No.: US 6,799,959 B1
(45) Date of Patent: Oct. 5, 2004

(54) APPARATUS FOR FORMING A THREE-DIMENSIONAL PRODUCT

(75) Inventors: Shigeaki Tochimoto, Takatsuki (JP); Naoki Kubo, Nishinomiya (JP)

(73) Assignee: Minolta Co., Ltd., Osaka (JP)

( * ) Notice: Subject to any disclaimer, the term of this patent is extended or adjusted under 35 U.S.C. 154(b) by 65 days.

(21) Appl. No.: 09/662,150

(22) Filed: Sep. 14, 2000

(30) Foreign Application Priority Data

Sep. 14, 1999 (JP) .......................................... P11-260394
May 24, 2000 (JP) ..................................... P2000-153394

(51) Int. Cl.[7] ............................................. B29C 31/08
(52) U.S. Cl. ..................................... 425/130; 425/375
(58) Field of Search ............................ 425/174, 174.4, 425/130, 375, 218, 447; 264/308, 113, 128

(56) References Cited

U.S. PATENT DOCUMENTS

| 3,663,137 A | * | 5/1972 | Haas et al. ................. 425/148 |
| 5,387,380 A | | 2/1995 | Cima et al. ................... 264/69 |
| 6,164,850 A | * | 12/2000 | Speakman ............. 400/120.09 |

FOREIGN PATENT DOCUMENTS

| JP | 10-207194 | 8/1998 |
| WO | WO 96/23647 | 8/1996 |

* cited by examiner

*Primary Examiner*—Robert Davis
*Assistant Examiner*—Joseph S Del Sole
(74) *Attorney, Agent, or Firm*—McDermott Will & Emery LLP

(57) ABSTRACT

In a 3D product forming apparatus, a nozzle head includes nozzles that respectively jet binders colored in yellow, magenta, cyan, and a nozzle that jets a binder colored in white. A powder layer can be formed on a product forming stage, and the binders are jetted onto the formed powder layer from the nozzle head. At a predetermined region in the powder layer, the powder is bound by the binders. The binders are jetted each time when a powder layer is laminated in forming a plurality of successively laminated powder layers, thereby to form a 3D product on the product forming stage. This allows the product to be colored as well in the product forming process. As a result, 3D products colored in various colors can be created in a short time and at a low cost.

3 Claims, 21 Drawing Sheets

MODEL DATA

CROSS-SECTION BODY

CONFIGURATION DATA
Y DATA
C DATA
M DATA
W DATA
CROSS-SECTION DATA

MODEL DATA

CROSS-SECTION BODY

PORTION THAT DOES NOT NEED FORMING
PORTION TO BE FORMED

CONFIGURATION DATA

C : CYAN
W : WHITE

C : CYAN
Y : YELLOW
W : WHITE

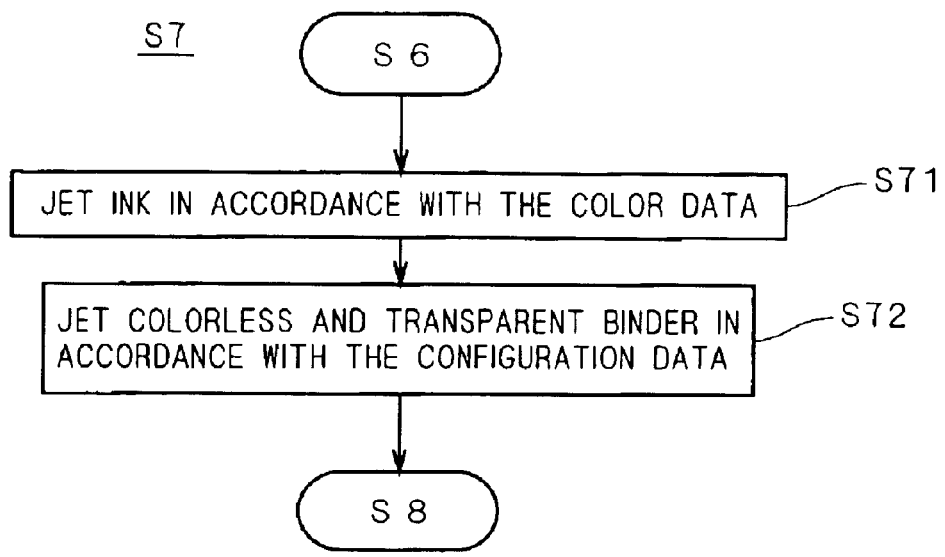
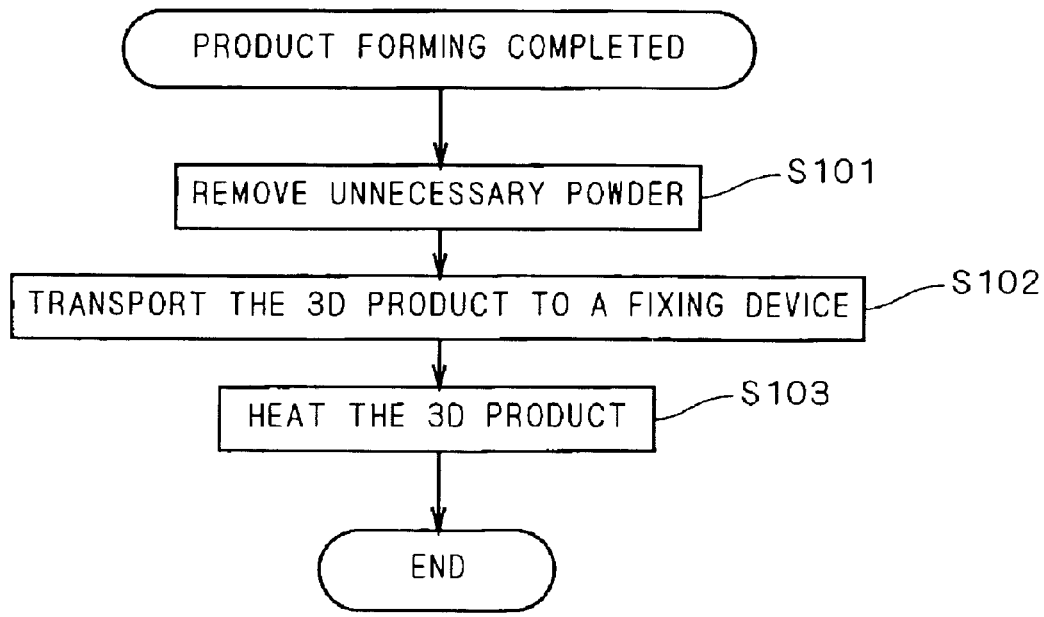

APPARATUS FOR FORMING A THREE-DIMENSIONAL PRODUCT

This application is based on applications Nos. 11-260394 (1999) and 2000-153394 filed in Japan, the contents of which are hereby incorporated by reference.

BACKGROUND OF THE INVENTION

1. Field of the Invention

The present invention relates to a technique about forming a three-dimensional (3D) product, and more particularly to a technique for forming a 3D product by imparting a binding material to bind powder.

2. Description of the Background Art

Hitherto, a technique is known in which a product being a 3D model of a 3D original object is created by successively binding, with a binding material, thin powder layers corresponding to respective cross sections obtained by cutting the 3D original object with a plurality of parallel planes.

Such a technique can be utilized for making a component sample called rapid prototyping and is disclosed, for example, in Japanese Patent No. 2729110. Specific procedures for forming a 3D product will be described hereafter.

First, a thin powder layer is spread uniformly on a flat surface by a blade mechanism. Next, a nozzle head is allowed to scan a predetermined region on the powder layer to jet a binder (binding material). The powder material on a region where the binder has been jetted is brought into a joined state and is further bound with a lower layer that has already been formed. Then, until the whole product is completed, powder layers are successively laminated on upper parts and the step of jetting the binder is repeated. Finally, the region to which the binder has not adhered is separated by dropping it in taking out the product from the forming apparatus because the powder in that region is individually in an independent state, namely in a mutually non-bound state. The above completes a desired 3D product.

However, by the above-mentioned technique, only a product in which the whole has a single property (sense of mass, color) can be obtained. If the product must be colored, the coloring must be carried out manually in the subsequent step, thereby requiring time and costs. Further, by manual coloring, it is generally difficult to draw with certainty a desired pattern and others at a predetermined position of the 3D product.

On the other hand, the 3D product immediately after the formation may have a small strength because the product is formed only by a binding force generated by the binder, so that the product may be broken depending on how the product is handled with. Conventionally, therefore, the strength has been enhanced by allowing a wax or the like to penetrate through gaps among powder particles of the 3D product after the formation. In reality, however, such a step requires labor and time.

SUMMARY OF THE INVENTION

The present invention is directed to an apparatus for forming a three-dimensional product by applying binder to powder material to form bound bodies successively, the bound bodies corresponding to sectional data blocks which are produced by slicing an original object with parallel planes.

According to the present invention, the apparatus comprises: a layer forming mechanism for forming a layer of the powder material; an applying head for applying plural kinds of materials to the layer, the plural kinds of materials including at least one kind of binder; and a controller for controlling the applying head to apply the plural kinds of materials selectively to a predetermined region on the layer.

Since the apparatus of the present invention can give various properties to three-dimensional products during the process of forming the three-dimensional products, three-dimensional products having various properties can be formed in a short time and at a low cost.

In an aspect of the present invention, the applying head applies binder and ink.

In another aspect of the present invention, the applying head applies a plurality of binders to the predetermined region, the plurality of binders have different colors from one another.

Preferably, the powder material is white.

The apparatus of the present invention can form three-dimensional products colored in various modes.

In another aspect of the present invention, the applying head applies a plurality of binders which give different senses of mass from one another to the three-dimensional product.

The apparatus of the present invention can form three-dimensional products having various senses of mass in a short time and at a low cost.

The present invention is also directed to another apparatus for forming a three-dimensional product by applying binder to powder material, the three-dimensional product corresponding to an object.

According to the present invention, the apparatus comprises: a layer forming mechanism for forming layers of powder material successively, the powder material having thermo plasticity; an applying head for applying material including binder to each layer after the layer forming mechanism formed the each layer to form bound bodies successively, the bound bodies corresponding to sections which are sliced off from the original object with parallel planes; and heater for heating a three-dimensional product formed by the layer forming mechanism and the applying head.

The apparatus of the present invention can easily enhance the strength of the three-dimensional products.

The present invention is also directed to a method of forming a three-dimensional product.

These and other objects, features, aspects, and advantages of the present invention will become more apparent from the following detailed description of the present invention when taken in conjunction with the accompanying drawings.

BRIEF DESCRIPTION OF THE DRAWINGS

FIG. 17 is a flowchart showing a flow of ink and binder jetting operations in the fourth embodiment;

FIG. 18 is a flowchart showing a flow of processes after the formation of a product is completed;

DESCRIPTION OF THE PREFERRED EMBODIMENTS

Figure 1:
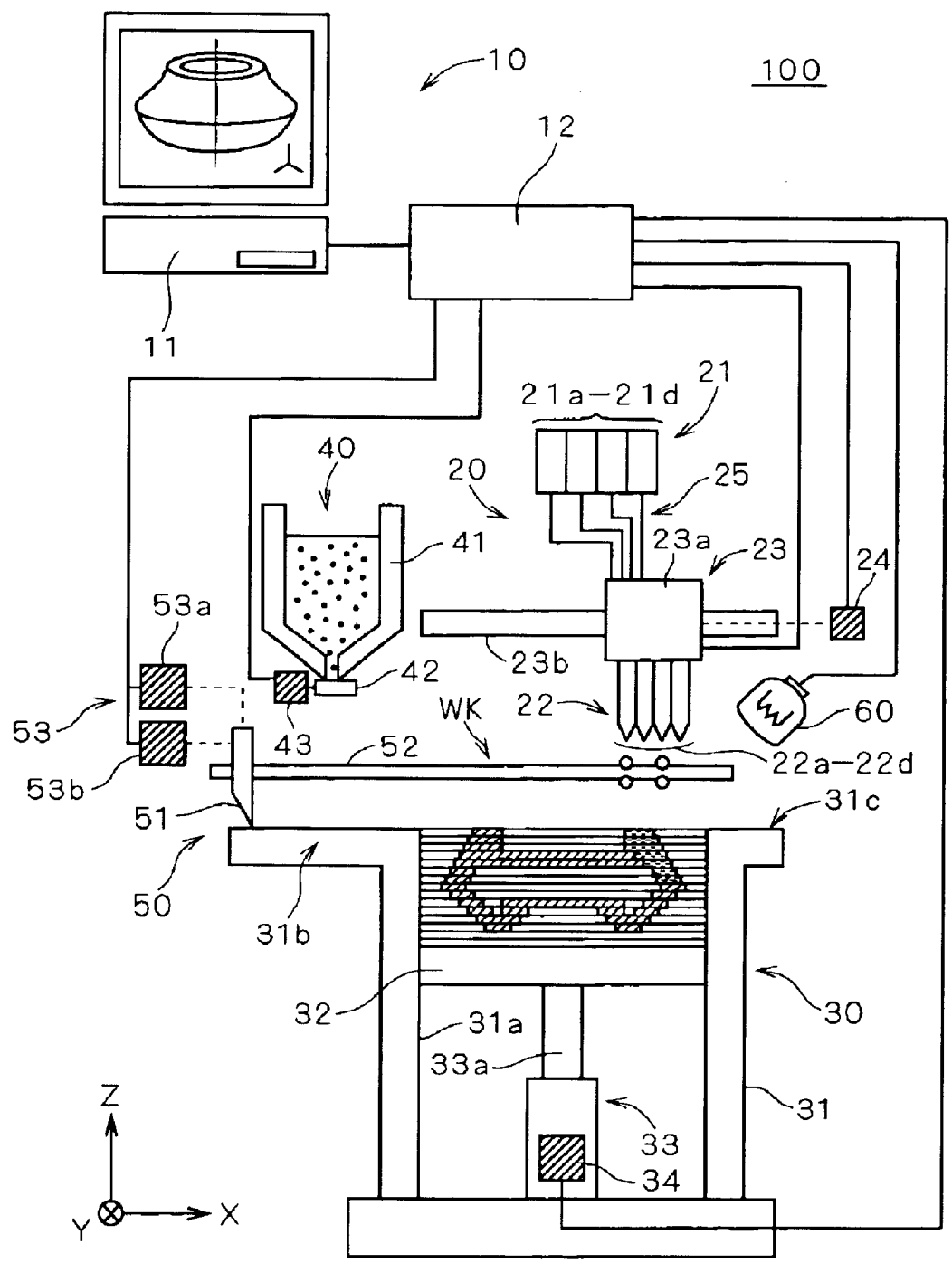
FIG. 1 is a schematic view illustrating a 3D product forming apparatus according to the first embodiment.

1. First Preferred Embodiment 1-1. Construction of Principal Part of 3D Product Forming Apparatus FIG. 1 is a schematic view showing a 3D product forming apparatus 100 according to the first embodiment. Here, in FIG. 1, XYZ directions determined for the sake of explanation are shown with arrows.

The 3D product forming apparatus 100 comprises a controlling part 10 as well as a binder applying part 20, a product forming part 30, a powder supplying part 40, a powder spreading part 50, and an infrared lamp 60, which are electrically connected with the controlling part 10, respectively.

The controlling part 10 includes a computer 11 and a drive controlling part 12 electrically connected with the computer 11.

The computer 11 is a general desk-top type computer or the like which is constructed to include a CPU, a memory, and others in the inside thereof. This computer 11 turns the 3D shape of an original object into data as model data, and outputs cross-section data, which is obtained by slicing the product into thin cross-section bodies of many parallel layers, to the drive controlling part 12.

The drive controlling part 12 functions as controlling means for respectively driving the binder applying part 20, the product forming part 30, the powder supplying part 40, and the powder spreading part 50. Upon obtaining the cross section data from the computer 11, the drive controlling part 12 collectively controls the operations of successively forming a powder bound body (bound layer) for each layer of the powder material in the product forming part 30 by giving driving instructions to each of the aforementioned parts on the basis of the cross section data.

The binder applying part 20 includes a tank part 21 for accommodating a liquid binder (a general adhesive may be used), a nozzle head 22 for jetting the binder in the tank part 21, an XY-direction moving part 23 for moving the nozzle head 22 in a horizontal XY-plane, and a driving part 24 for driving the XY-direction moving part 23.

The tank part 21 includes a plurality of tanks (four tanks in this example) 21a to 21d for accommodating binders of mutually different colors. Specifically, the tanks 21a to 21d accommodate binders (hereafter referred to as colored binders) colored in three primary colors of Y (yellow), M (magenta), C (cyan), and W (white), respectively. Here, it is preferable to use colored binders whose colors do not change even if the binders are bound with the powder, and whose colors do not change or fade even after a long time passes.

The nozzle head 22 is fixed to a lower part of the XY-direction moving part 23, and is integral with the XY-direction moving part 23 to be freely movable in the XY-plane. Further, the nozzle head 22 includes the same number of jetting nozzles 22a to 22d as the tanks 21a to 21d of the tank part 21. The jetting nozzles 22a to 22d are connected to the tanks 21a to 21d, respectively, with four tubes 25. Each of the nozzles 22a to 22d is a nozzle that jets (erupts) each binder as minute liquid drops, for example, by an ink jet system or the like. The jetting of the binder by each of the jetting nozzles 22a to 22d is individually controlled by the drive controlling part 12, and the binder jetted from each of the jetting nozzles 22a to 22d adheres to a powder layer of the product forming part 30 disposed at a place opposite to the nozzle head 22.

The XY-direction moving part 23 includes a moving part main body 23a and a guide rail 23b. The moving part main body 23a is capable of reciprocal movement in the X-direction along the guide rail 23b, and is capable of reciprocal movement in the Y-direction. Therefore, the XY-direction moving part 23 makes the nozzle head 22 capable of moving in a plane defined by the X-axis and the Y-axis. In other words, on the basis of the driving instructions from the drive controlling part 12, the nozzle head 22 can be allowed to move to an arbitrary position within a drive range in the plane.

The product forming part 30 includes a product forming main body 31 having a recessed part at the center thereof, a product forming stage 32 disposed in the inside of the recessed part of the product forming main body 31, a Z-direction moving part 33 for moving the product forming stage 32 in the Z-direction, and a driving part 34 for driving the Z-direction moving part 33.

The product forming main body 31 serves to provide a work area for creating a 3D product. Further, the product forming main body 31 has, at an upper portion thereof, a provisional powder placing part 31b for temporarily holding the powder supplied from the powder supplying part 40.

The product forming stage 32 has a rectangular shape in an XY-cross section, and its side surface is in contact with a vertical inner wall 31a of the recessed part in the product forming main body 31. A three-dimensional space WK having a rectangular parallelopiped shape, which is formed by the product forming stage 32 and the vertical inner wall 31a of the product forming main body 31, defines a base space for forming a 3D product. Namely, the binders jetted from the jetting nozzles 22a to 22d create the 3D product by joining the powder on the product forming stage 32.

The Z-direction moving part 33 has a supporting rod 33a that is linked to the product forming stage 32. Movement of the supporting rod 33a in a vertical direction caused by the driving part 34 allows Z-direction movement of the product forming stage 32 linked to the supporting rod 33a.

The powder supplying part 40 includes a tank part 41, a shutting plate 42 disposed at an outlet of the tank part 41, and a driving part 43 for sliding the shutting plate 42 by instructions from the drive controlling part 12.

The tank part 41 accommodates a white powder. This powder serves as a material in forming a 3D product, and may be, for example, a (cellulose)-starch powder, a gypsum powder, a resin powder, or the like.

The shutting plate 42 is adapted to be capable of sliding in the horizontal direction (X-direction), and performs or stops the supply of the powder, which is accommodated in the tank part 41, to the provisional powder placing part 31b of the product forming part 30.

The powder diffusing part 50 includes a blade 51, a guide rail 52 for regulating the operation of the blade 51, and a driving part 53 for moving the blade 51.

The blade 51 is long in the Y-direction and has an edge-like shape whose lower tip end is sharp. The blade 51 has a length in the Y-direction such that the length can cover the width in the Y-direction in the three-dimensional space WK. Here, a vibration mechanism for giving a minute vibration to the blade may be added so that the blade 51 can smoothly diffuse the powder.

The driving part 53 has a vertical driving part 53a for moving the blade 51 up and down in the vertical direction (Z-direction) and a horizontal driving part 53b for reciprocating the blade 51 in the horizontal direction (X-direction). The vertical driving part 53a and the horizontal driving part 53b being driven on the basis of instructions from the drive controlling part 12 allow movement of the blade 51 in the X-direction and in the Z-direction.

The infrared lamp 60 is disposed for promoting the binding of the powder to which the binder is applied, by evaporating the moisture or solvent contained in the binder. The infrared lamp 60 is turned on and off by instructions from the drive controlling part 12. Further, if the product forming apparatus is constructed to use a thermosetting binder, the infrared lamp 60 functions as means for setting (hardening) the binder.

1-2. Operation of 3D Product Forming Apparatus

Figure 2:
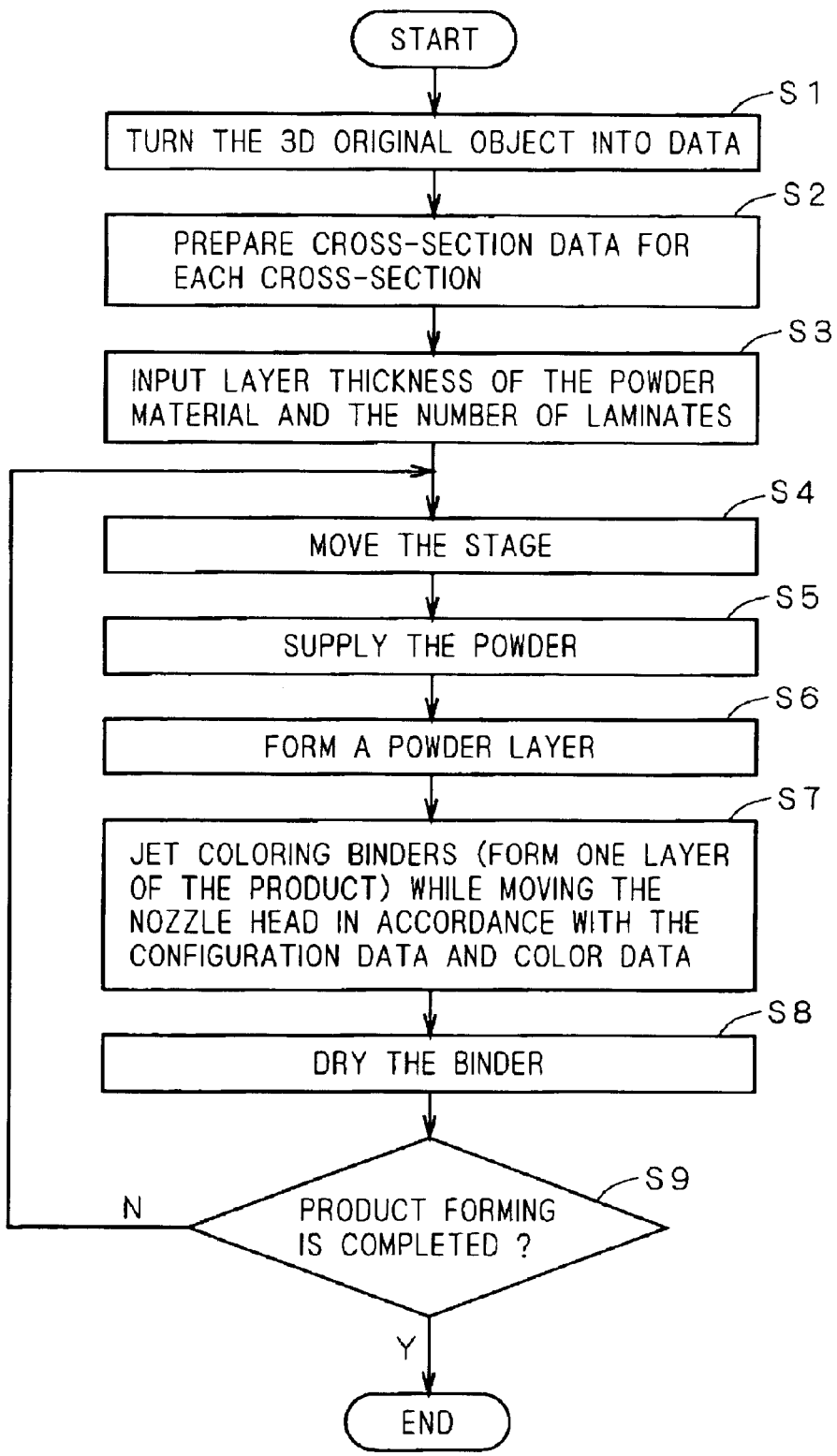
FIG. 2 is a flowchart for describing an overall operation of the 3D product forming apparatus.

FIG. 2 is a flowchart for describing an overall operation of the 3D product forming apparatus 100. Hereafter, the basic operations of the apparatus 100 will be described with reference to FIG. 2.

In step S1, the computer 11 creates model data that represent the 3D original object whose surface has been subjected to color patterning and others. As the model data that constitutes a basis for forming a 3D product, one can make use of a three-dimensional color model data that is created by a general three-dimensional CAD modeling software. Further, it is possible to utilize data and texture of a three-dimensional configuration measured by a 3D configuration input device.

In some model data, color information is imparted only to the surface of a 3D model, while in other model data, color information is imparted to the inside of the model as well. Even in the latter case, it is possible to use only the color information on the model surface in forming a 3D product, or alternatively it is possible to use the color information on the inside of the model as well. For example, in forming a 3D product such as a human body model, it may be desired to color each internal organ with a different color. In such a case, the color information on the inside of the model is utilized.

In step S2, cross-section data for each cross section is created which is obtained by slicing the 3D original object in a horizontal direction from the above-mentioned model data. The model data is sliced at a pitch corresponding to the thickness of one powder layer of lamination to produce cross-section bodies, and the configuration data and the color data that show a region where the cross section exists are created as cross-section data. Here, the slicing pitch may be made changeable within a predetermined range (range of thickness that can bind the powder).

Figure 3A:
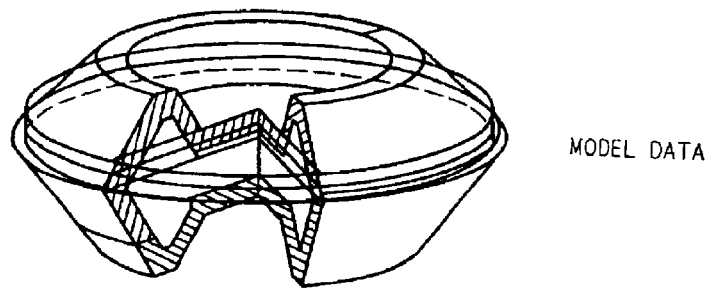
FIG. 3A is a view showing an example of model data.
Figure 3B:
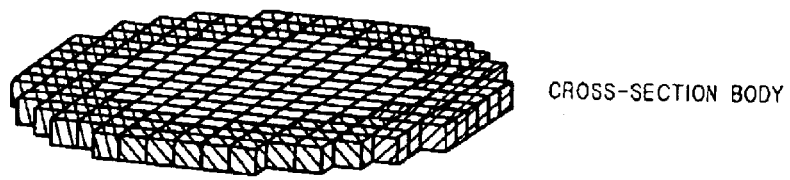
FIG. 3B is a view showing an example of a cross-section body.
Figure 3C:
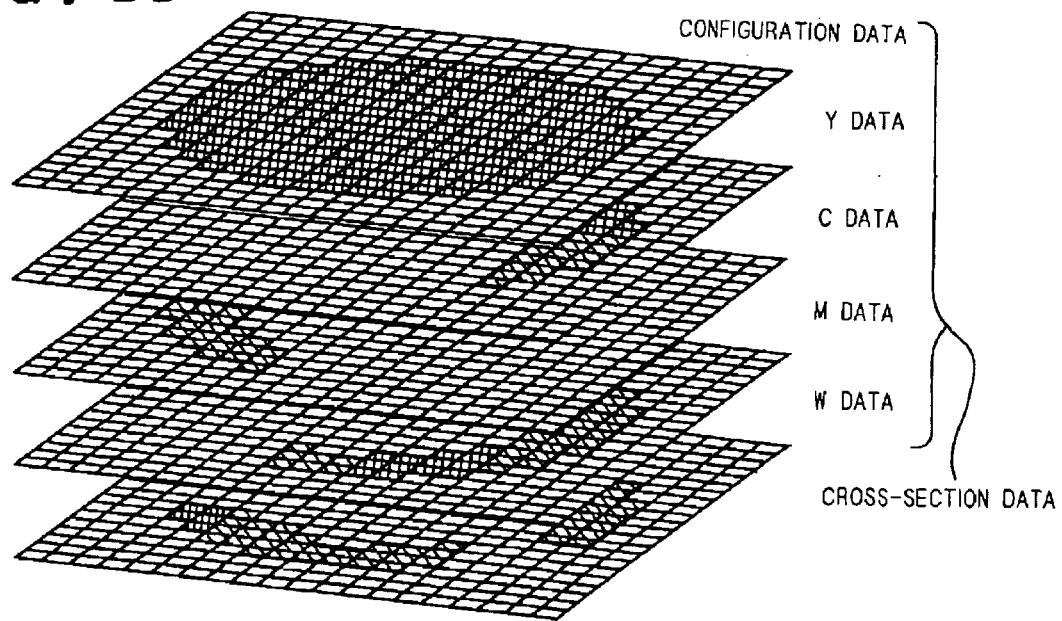
FIG. 3C is a view showing an example of cross-section data.

FIGS. 3A to 3C are views showing how an example of cross-section data is created in step S2. Referring to FIGS. 3A and 3B, a cross-section body including color information is cut out from the model data, and divided into many small parts in a lattice-like configuration. This is treated in the same manner as a bit map of a two-dimensional image, and is converted into bit map information for each color, as illustrated in FIG. 3C. This bit map information is information in which gray scale and others are taken into account. Referring to FIG. 3C, the configuration data is a data that indicates a region where the cross section exits, and Y data, C data, M data, and W data correspond to the color data.

Here, in this embodiment, since the color of the powder is white, white parts need not be colored. However, in order to form a 3D product, binders are required, so that the white binder is applied to these parts in this embodiment, and W data is imparted to these parts. Also, if the inside of the 3D model has no color information, the W data is imparted also to the parts corresponding to the inside of the 3D model. Thus, if an OR (logical sum) of the YCMW data is taken, the entire surface of the cross section is filled.

Figure 4A:
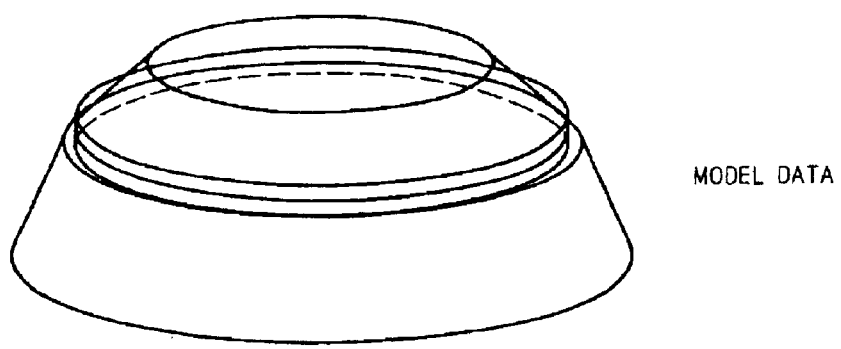
FIG. 4A is a view showing an example of model data.
Figure 4B:
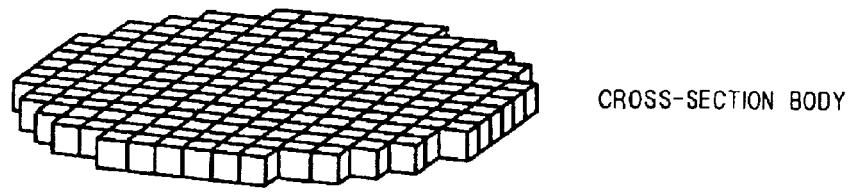
FIG. 4B is a view showing an example of a cross-section body.
Figure 4C:
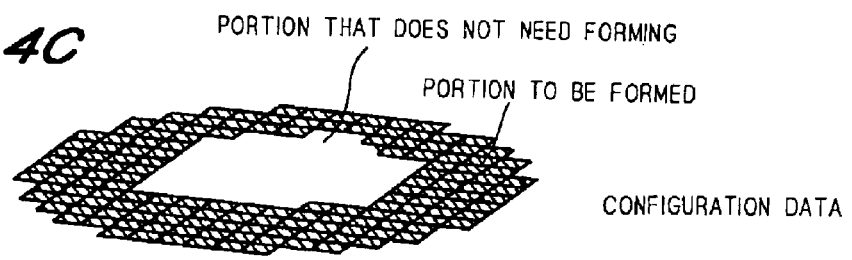
FIG. 4C is a view showing an example of cross-section data (configuration data)

FIGS. 4A to 4C are views showing how an example of cross-section data is created in step S2 in the same manner as in FIGS. 3A to 3C. Here, in FIG. 4C, illustration of the color data is omitted, and the configuration data is illustrated only for a region where the cross section exists. In FIG. 4C, the parts that do not contribute to the 3D product formation in the model data, i.e. the parts corresponding to the inner regions that do not appear to the outside, are deleted from the configuration data as the parts that do not need to be formed. Thus, in the parts that do not need to be formed, the operation of binding the powder with the binders is not carried out, thereby saving the binders.

In step S3, information on the lamination thickness of the powder in forming a 3D product of the 3D original object (i.e. slice pitch in creating the cross section data) and on the number of laminates (the number of cross section data sets) is input from the computer 11 to the drive controlling part 12.

Figure 5A:
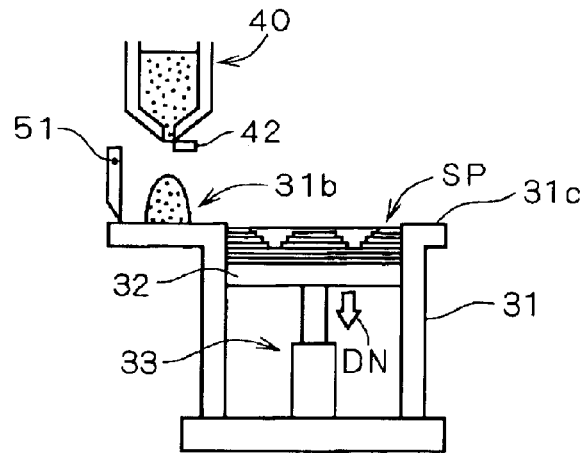
FIGS. 5A to 5C are conceptual views for describing the operation of the 3D product forming apparatus.
Figure 5B:
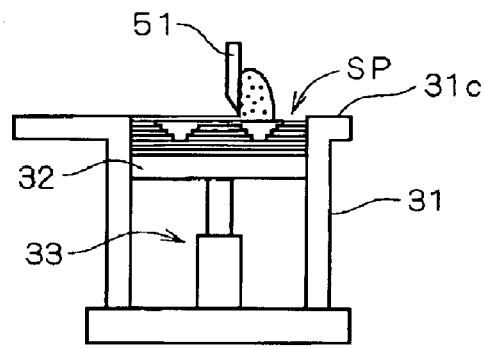
Figure 5C:
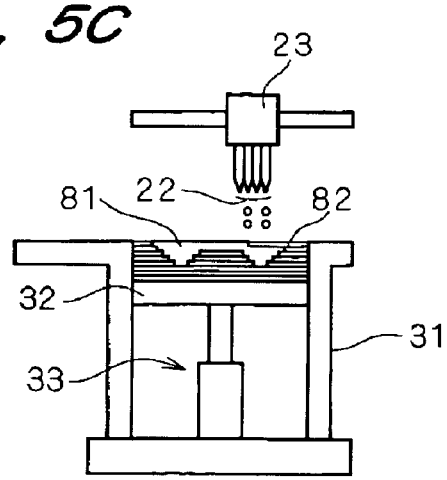

In the next step S4 and thereafter, the drive controlling part 12 controls each part to perform the operations. FIGS. 5A to 5C are conceptual views for describing these operations. Hereafter, the descriptions will be made with reference to FIGS. 5A to 5C.

In step S4, the product forming stage 32 is lowered by a predetermined distance in the direction of arrow DN illustrated in FIG. 5A by the Z-direction moving part 33 and held in order to form a bound body of the N-th powder layer (N=1, 2, ... ) on the product forming stage 32. The distance for lowering is a distance corresponding to the above-mentioned laminate thickness input from the computer 11.

This forms a space SP for forming one new powder layer on the powder layers that have been laminated on the product forming stage 32 and completed the necessary binding. However, in the case of N=1, it corresponds to the first layer, so that the space SP is formed immediately above the upper surface of the product forming stage 32.

In step S5, a powder is supplied which serves as the material for forming the 3D product. In this step, the shutting plate 42 of the powder supplying part 40 is slid from the closed position, as shown in FIG. 5A, to allow the powder in the tank 41 to fall at a predetermined amount onto the provisional powder placing part 31b of the product forming main body 31. This predetermined amount is set to be a little larger than the volume of the above-mentioned space SP (the amount of the powder needed for forming the product). After the supply of the predetermined amount of powder is completed, the shutting plate 42 returns to the closed position, and stops the supply of the powder.

In step S6, a thin layer of the powder supplied in the step S5 is formed. Here, as illustrated in FIGS. 5A and 5B, the powder deposited on the provisional powder placing part 31b is conveyed (transported) to the space SP on the product forming stage 32 by the blade 51 moving in the X-direction, thereby to form a thin uniform powder layer. At this time, the lower tip end of the blade 51 is moved along the uppermost surface 31c of the product forming main body 31. This allows precise formation of the thin powder layer having a predetermined thickness. Here, the residual powder is collected and can be used again. After the powder layer is formed, the blade 51 is separated from the uppermost surface 31c by the vertical driving part 53a (See FIG. 1), and is allowed to pass above the powder layer by the horizontal driving part 53b to return to the initial position.

In step S7, the nozzle head 22 is moved in the XY-plane, as shown in FIG. 5C, by driving the XY-direction moving part 23 in accordance with the configuration data and the color data prepared in the step S2. At this time, the scanning time is shortened by allowing the nozzle head 22 to scan only the region where the configuration data exists. While the nozzle head 22 is moving, each of the jetting nozzles 22a to 22d is suitably allowed to jet a colored binder on the basis of the color data. This creates a bound body 81 of the powder. Here, the powder 82 to which the binders have not been applied is kept in an individually independent state.

In this step, in jetting the binders to the parts corresponding to the surface parts of the 3D product, control is made to selectively jet the colored binders of Y, M, C, and W on the basis of the color data derived from the 3D original object. This makes it possible to form a colored product during the process of forming the 3D product. On the other hand, the parts of the 3D product that need not be colored (non-coloring region) are formed by jetting the W-colored binder that does not hinder the colored state of the colored parts.

Further, in order to ensure the strength of the 3D product by uniformizing the spread of the binders adhering to the powder layer, it is preferable to uniformly apply the same amount of the powders per unit area to the parts to be formed. For example, the same amount of the binders can be applied uniformly per unit area if the product obtained by multiplying the moving speed of each of the nozzles 22a to 22d by the XY-direction moving part 23 with the amount of the binder (for example, the number of liquid drops of the binder) jetted from each of the nozzles 22a to 22d per unit period of time is made constant.

After the jetting of the binders is completed, the operation of jetting the binders is stopped, and the XY-direction moving part 23 is driven to allow the nozzle head 22 to return to the initial position.

In step S8, the powder having the binders adhering thereto is dried for joining. Here, radiation from the infrared lamp 60 is carried out from above the thinly extended powder layer. This allows quick drying of the binders adhering to the powder. Here, in the case of binders that are quickly hardened by natural drying, the radiation by the infrared lamp 60 is not particularly needed. When the drying is completed, the formation of a cross section body for one layer of the 3D product is completed.

When the formation of one layer is ended, the procedure goes to the step S9, where the drive controlling part 12 judges, on the basis of the number of laminates input in the step S3, whether the process of lamination for the number of laminates has been completed or not (i.e. whether the formation of the 3D product has been completed or not). If the judgement is "NO", the process from the step S4 is repeated, whereas if the judgement is "YES", the forming operation is ended. When the formation of the 3D product is completed, the powder to which the binders have not been applied is separated to take out the bound body (3D product) of the powder bound by the binders. Here, the unbound powder may be collected and used again as the material.

If the procedure returns to the step S4, an operation is carried out to form a new powder bound body of the (N+1)-th layer on the upper side of the N-th layer. By repeating these operations for the number of laminates, the colored bound bodies are successively laminated layer by layer on the stage 32, whereby a 3D product of the 3D original object is finally formed on the product forming stage 32.

Figure 6A:
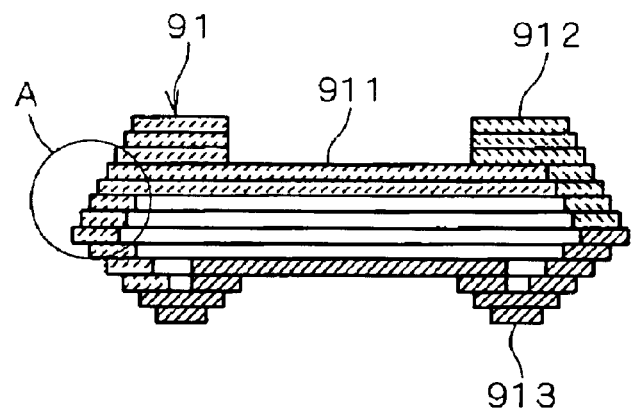
FIG. 6A is a cross-section view illustrating a 3D product obtained in the first embodiment.
Figure 6B:
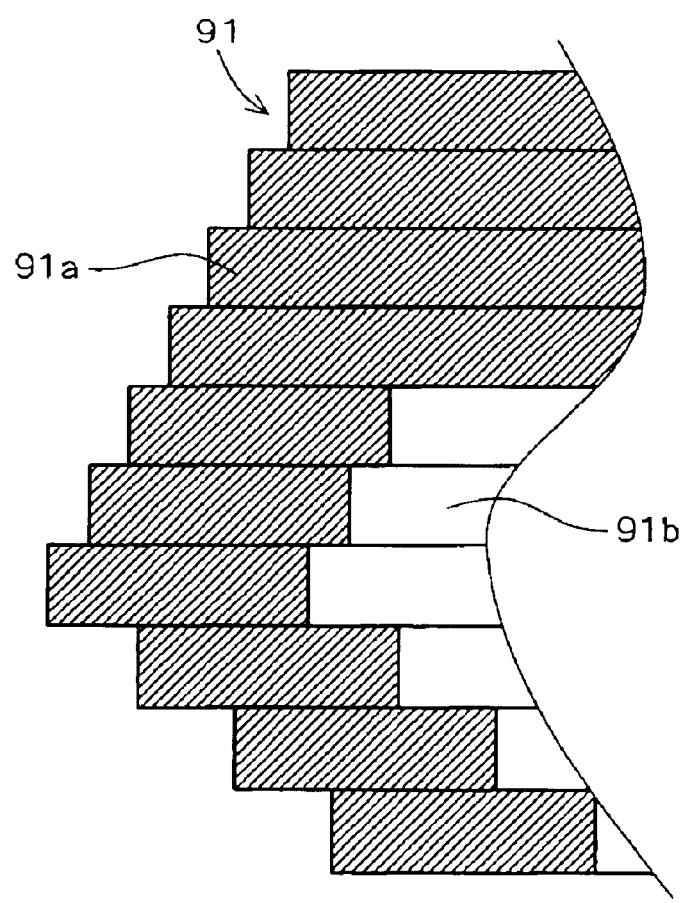
FIG. 6B is a partial enlarged view.

The 3D product 91 obtained in this manner is shown in FIGS. 6A and 6B. FIG. 6A shows a cross section of the 3D product 91, and FIG. 6B shows an enlarged representation of the A part in FIG. 6A. Referring to FIG. 6B, the region 91a near the surface side of the 3D product 91 is colored with a single color or a plurality of colors by the binder of W, M, C, and W, as illustrated in hatches, and the region 91b in the inside of the 3D product 91 is formed with a colored binder of W. In other words, the colored region in FIG. 6B is formed by selectively jetting the colored binders from the jetting nozzles 22a to 22d in accordance with the color data, whereas the inside region, which does not need coloring, is formed by jetting the white binder from the jetting nozzle 22d for the purpose of simply joining the powder.

By using such a coloring mechanism, various coloring is made possible. For example, among the colored regions in FIG. 6A, the region 911 can be colored in thin yellow by a predetermined arrangement of dots in yellow Y and white W, the region 912 can be colored in green by arrangement of dots in cyan C and yellow Y, and the region 913 can be colored in stripes by alternate arrangement of magenta sections and white W sections in bands.

Further, one 3D product itself may be colored with a single color (for example, yellow), while another 3D product may be colored in a different color.

In other words, in the present invention, capability of various coloring includes two meanings: increase of the degree of freedom in coloring for one 3D product, and capability of changing the color for each of various 3D products.

Therefore, by adopting a construction such as the 3D product forming apparatus 100 in this embodiment and selectively imparting a plurality of colors in accordance with the color information, various coloring can be performed in the process of forming a 3D product, and a colored product can be created in a short time and at a low cost without resorting to manual labor.

Referring to FIG. 6B, the colored region is not limited to the surface of the 3D product 91 alone but extends to a little inside region. Generally, since the regions that need coloring are limited typically to the surface of the product, it is sufficient to perform coloring with a colored binder on only the part of the product appearing on the surface. However, in the case of a product having a overhung part or an underhung part, the parts that are not colored appear on the surface of the product unless the inside of the outermost layer of the cross section bodies of adjacent upper and lower layers is colored.

Furthermore, strictly coloring only the surface needs a highly precise control of the amount of the movement of the nozzle head 22 and the jetting timing of the binders, so that it is preferable to ensure an offset of the color information in the cross section data by a predetermined width to the inside. Furthermore, by forming a colored region to the inside for a predetermined amount as illustrated in FIG. 6B, it is possible to prevent the white color of the binder for the inside from being exposed even if scratches or the like are generated in the surface of the 3D product 91.

The binder for use in joining the powder in the inside region of the product need not be white, so that a natural binder (colorless and transparent, milky white) that is not colored may be used.

Further, it is preferable that a binder of a specific color for joining the inside is stored in the tank part 21 in a larger amount than the binders of the other colors. Also, even the inside region of the 3D product can be colored in different colors so as to classify the internal structures. It is effective to color also the inside region of the 3D product if the 3D product is cut after forming the product, and the cross-section structures are shown as a cut model.

If a system of CAD/CAM/CAE is introduced to the computer 11 in the 3D product forming apparatus 100 in this embodiment, it is possible to increase the speed in forming the product and quality improvement of design can be promoted.

1-3. Specific Modes of Coloring

Next, coloring in the process of forming a 3D product in this embodiment will be described.

In this embodiment, binders are used for binding the powder serving as a material for forming the 3D product, and the 3D product is colored during the process of forming the 3D product by jetting the colored binders of the four colors of Y, M, C, and W. In a microscopic view, the particles of the colored binders smaller than the powder particles adhere to the peripheries of the powder particles and fill the gap between the powder particles, whereby the coloring is performed.

Among the jetting nozzles 22a to 22d, the jetting nozzles 22a to 22c jet the colored binders of the color components of Y, M, C that can represent different color components by mixing the fundamental colors, while the jetting nozzle 22d jets the colored binder of white. A mixed color or a gray scale (density scale) of colors can be represented as an area gray scale in the 3D product by an assembly of the dot arrangements of the minute liquid drops of the binders jetted from the nozzles 22a to 22d.

Generally, it is sufficient to mix three primary colors of Y, M, C in order to color the product; however, in order to represent the depth of color (gray scale), it is effective to jet and mix a white binder in addition to the binders of the three primary colors. Since letters and images are printed on a sheet of white paper with ink, toner, or the like in a general printer or the like, the white ink is not necessary if the white color of the paper serving as the base material is utilized, and the depth of each color component can be represented fundamentally by using the three colors of Y, M, C. However, in the case where the color of the powder serving as the material for forming the 3D product is not white, it is especially effective to use the white binder.

In other words, although a dark color can be represented by mixing the color components of Y, M, C, the white color cannot be represented thereby, so that by preparing a binder of faint color such as white for binding the powder, and using the white binder also in coloring the surface, a suitable coloring can be carried out on the 3D product 91.

Hereafter, descriptions will be made on an example of a mode of jetting the colored binders in the case of representing the depth in coloring the 3D product 91 in this manner.

Figure 7:
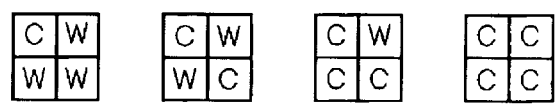
FIG. 7 is a view illustrating an example of gray scale (density scale) representation for cyan color.

FIG. 7 is a view illustrating an example of gray scale representation for cyan. When the drive controlling part 12 performs a predetermined gray scale conversion, a multi-valued gray scale data contained in the cross section data is converted into two-value (binary) data for each fundamental dot region (the smallest rectangle in FIG. 7). The fundamental dot region is the smallest unit to which a selected one of the four kinds of the colored binders is applied, and the two-value data serves as information for controlling ON/OFF of each of the jetting nozzles 22a to 22d.

FIG. 7 illustrates a fundamental assembly region by a 2×2 matrix arrangement of fundamental dot regions. By changing the jetting pattern of the binders of color components to the fundamental dot region for coloring, gray scale representation or mixed color representation is made possible. In the case of representing a faint cyan, cyan is jetted to one fundamental dot region in the 2×2 matrix arrangement, and white is jetted to the other fundamental dot regions. Further, in the case of representing a deep cyan, cyan is jetted to the whole of the fundamental assembly region. Thus, by changing the jetting ratio of the cyan binder and the white binder to the fundamental assembly region, the gray scale change from faint cyan to deep cyan can be suitably represented.

In the example of FIG. 7, for the sake of explanation, the fundamental assembly region for coloring generated by gray scale conversion is constructed with four fundamental dot regions; however, it is not limited thereto. For example, if the cross section data has 256 gray scales and is to be converted into 2-value (binary) data for controlling ON/OFF without decreasing the gray scale, the fundamental assembly region is constructed with an assembly of 256 fundamental dot regions.

Figure 8:
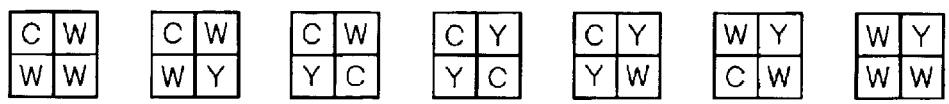
FIG. 8 is a view illustrating an example of representation in which the color changes from faint cyan to faint yellow.

Next, FIG. 8 is a view showing an example of representation in which the color changes from faint cyan to faint yellow. The left end of FIG. 8 is a jetting pattern of C and W in representing faint cyan, and the right end is a jetting pattern of Y and W in representing faint yellow. In changing the color from faint cyan to faint yellow through a mixed color of cyan and yellow, such a color change can be represented by gradually changing the ratio of jetting C, Y, and W into the fundamental assembly region, as shown in FIG. 8.

Even in such a case, as already described, the colored binders of C, Y, and W are preferably jetted in the same amount per unit area in order to ensure the strength of the 3D product.

Figures 9A, 9B:
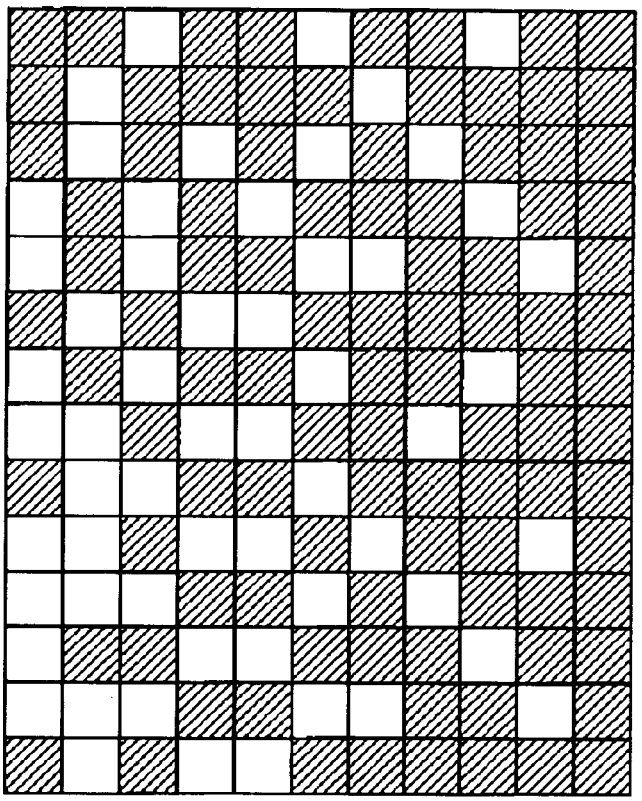
FIGS. 9A and 9B are views illustrating an example of coloring.

FIGS. 9A and 9B show that a plurality of the aforesaid fundamental assembly regions for coloring are assembled. FIG. 9A shows a jetting pattern of C and W, and FIG. 9B specifically shows a coloring mode represented by the jetting pattern of FIG. 9A. As shown in FIGS. 9A and 9B, the 3D product 91 can be colored in the product forming process by the drive controlling part 12 controlling the jetting pattern.

Thus, in this embodiment, the colored binders of Y, M, C, and W are used for joining and coloring in forming a colored part of the 3D product 91, and the white binder is used for joining the inside in forming the inside of the 3D product 91, whereby the coloring can be made in accordance with the 3D original object during the product forming process.

Here, the colored binders jetted from the jetting nozzles 22a to 22c may be respectively colored with other color components (for example, R (red), G (green), B (blue), and others); however, by using and mixing the binders colored in the three primary colors of Y, M, and C, it produces an effect that the 3D product 91 can be colored in all the color components such as intermediate colors.

Further, the binder jetted from the jetting nozzle 22d that functions only for joining the powder is not limited to white alone, and may be a binder having a cream color or the like. However, a white binder is preferably used for joining in order to vividly represent the white color or gray scale of the 3D original object in the 3D product 91.

Furthermore, if black is to be represented on the surface side of the 3D product 91, the black color can be represented by jetting the three primary colors of Y, M, and C; however, in order to reproduce vivid black color, a nozzle for jetting a binder colored in black may be separately provided.

Also, binders of two or more colors may be jetted simultaneously from the jetting nozzles, or alternatively binders of different colors may be jetted with a time interval.

In this embodiment, the powder serving as a material of the 3D product is a white powder. In the case of printers, images are printed on white paper sheets, so that colored inks are applied only on portions to be colored, and gray scale representation of color is made by a balance with the underlying white color. In the same manner, in this embodiment, color generation can be improved by using white powder as the underlying powder.

If the powder material has a ground color instead of being colorless and transparent, it is sufficient that the colorless and transparent binder is applied to a region which is to have the same color as the ground color of the powder material. Further, if the color corresponding to the ground color of the powder material is to be thinned, the colorless and transparent binders and the white binders may be arranged in dots at a predetermined ratio. For this reason, if a colorless and transparent binder is included in a plurality of binders, it is preferable to prepare a binder having a color different from the ground color rather than preparing a binder of the same color as the ground color, whereby the width of color representation is all the more widened.

1-4. Specific Embodiment of White Powder Material

Next, a specific example of the powder material in the case of white powder will be described. As already described, the white powder for use may be starch powder, gypsum powder, or the like. However, in order to more suitably realize the color representation of the colored 3D product, it is preferable to produce the white powder with the use of a white pigment. In other words, by performing coloring with YMCK (black) on a white powder that uses a white pigment, the color of the 3D product can be made more vivid and a suitable multi-gray-scale representation can be realized. If a white powder is used, a colorless and transparent binder is imparted to the white portion of the 3D product.

As the powder that uses a white pigment, powder made from white pigment itself, mixture of starch powder or gypsum powder with white pigment, resin powder such as polyethylene containing white pigment, and others can be utilized.

If a white pigment is to be mixed with a principal product-forming material powder (main product-forming particles) such as starch powder or gypsum powder, the particle size of the white pigment is preferably smaller than the particle size of the 3D product forming material powder. This allows the surface of the 3D product forming material powder to be covered with the fine particles of the white pigment when these two are mixed, thereby improving the color generation of white in the powder material. As a result, color reproducibility and gray scale reproducibility of the 3D product are improved.

Further, in the case of allowing white pigment to be contained in resin powder, a suitable white powder material can be obtained by dispersing white pigment in a hot-melted resin for mixing in the process of producing the resin powder (white pigment may be kneaded therein) to make the resin colored in white, followed by forming it into powder. On the other hand, if a thermoplastic resin powder is to be used as a principal 3D product forming material powder, only the surface of the resin powder can be suitably turned into white by allowing the white pigment to be adsorbed around the powder particles in a state in which the resin powder is heated and softened.

Specific examples of white pigment for use include basic lead carbonate ($2PbCO_3Pb(OH)_2$, so-called silver white), zinc oxide (ZnO, so-called zinc white), titanium oxide ($TiO_2$, so-called titanium white), strontium titanate ($SrTiO_3$, so-called titanium strontium white), and others.

Here, as compared with other white pigments, titanium oxide has a smaller specific weight, has a larger refractive index, and is more stable both chemically and physically, so that it has a larger hiding power and coloring power as a pigment, and is excellent in the durability against acid, alkali, and other environments. Therefore, it is preferable to use titanium oxide as the white pigment. Needless to say, other white pigments may be used in accordance with the type of the powder material and the binder components (those other than the enumerated white pigments may be used).

1-5. Other Examples of Powder Material

As another example of the powder material described above, a biodegradable resin powder may be used. By utilizing the biodegradable resin powder, the 3D product can be decomposed into water, carbon dioxide, and others owing to microorganisms in nature by burying the product in earth after the fabricated 3D product becomes unnecessary. As a result, wastes can be suitably discarded.

The biodegradable resins are classified into "those utilizing natural substances", "those produced by microorganisms", and "those chemically synthesized".

Those utilizing natural substances are, for example, mixture of natural polymer such as cellulose or starch with plastics, chemically modified natural polymers, and others. For example, "EVACORN" manufactured by Nippon Corn Starch Co., Ltd., "MATABY" manufactured by Novamont Co., Ltd. in Italy, and others may be mentioned.

Biodegradable resins produced by microorganisms are produced by utilizing a property of microorganisms that store aliphatic polyesters in the cells thereof. For example, "BIOPOLE" manufactured by Monsanto Co., Ltd. in the United States, "BIOGREEN" manufactured by Mitsubishi Gas Chemical Co., Ltd., and others may be mentioned.

Those chemically synthesized are, for example, polycaprolactone, polylactic acid, polyvinyl alcohol, and others, and are produced by polymerization reaction or fermentation method. For example, "REISIA" manufactured by Mitsui Chemical Co., Ltd., "CELLGREEN" manufactured by Daicel Chemical Industry Co., Ltd., "ECOPLAY" manufactured by Cargill Co., Ltd. in the United States, and others may be mentioned.

Here, if biodegradable plastics are to be utilized, they have good compatibility with various adhesives such as produced from vinyl acetate, urea, acryl, or urethane, because their main source materials are natural materials such as starch or cellulose, so that they can improve the fixation strength of the 3D product.

2. Second Preferred Embodiment 2-1. Construction of Essential Parts of the 3D Product Forming Apparatus The construction of the 3D product forming apparatus of the second embodiment is similar to the 3D product forming apparatus 100 of the first embodiment; however, each tank is provided with a sensor for sensing the amount of the remaining colored binder.

Figure 10:
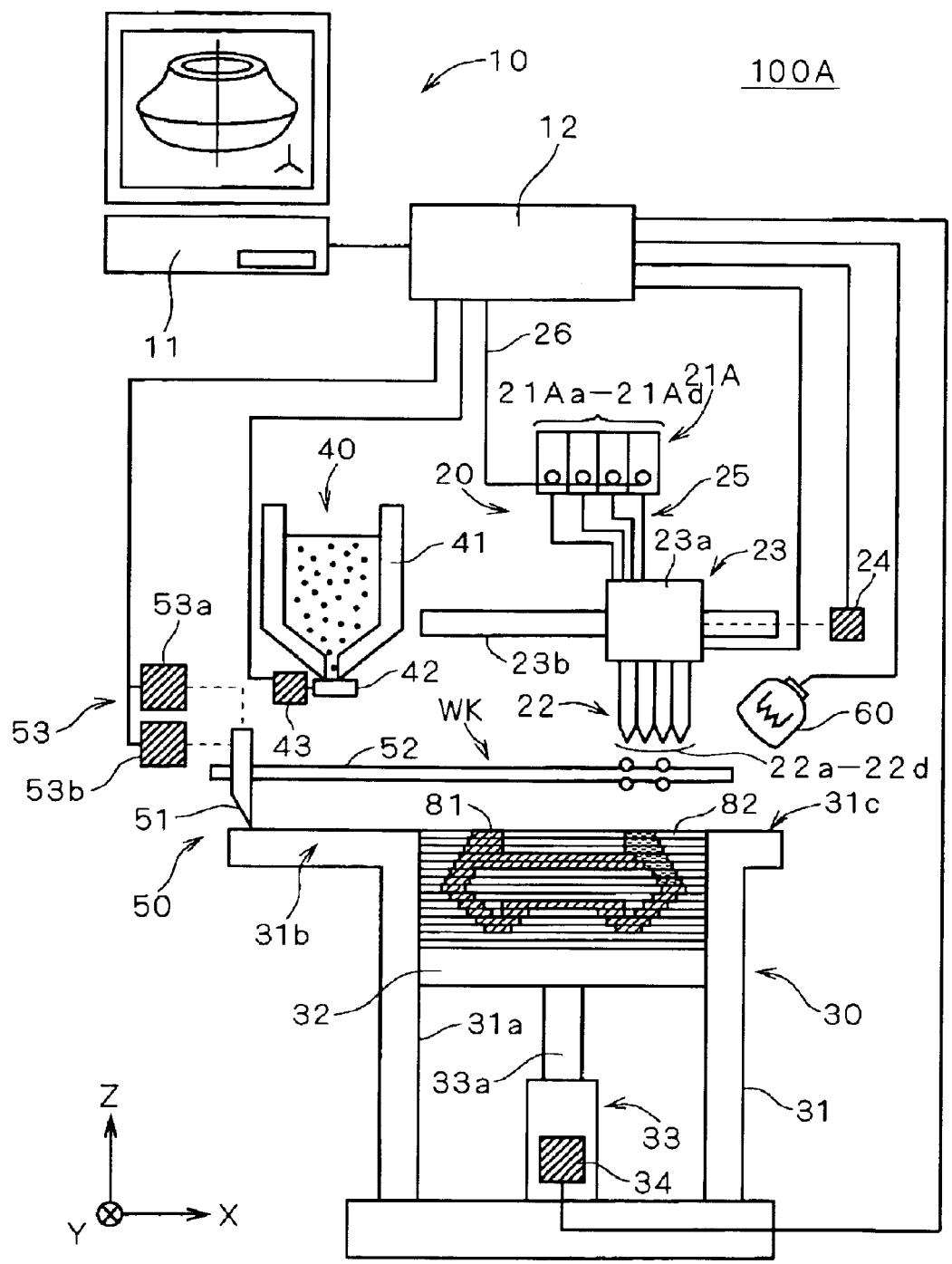
FIG. 10 is a schematic view illustrating a 3D product forming apparatus according to the second embodiment.

FIG. 10 is a schematic view of a 3D product forming apparatus 100A according to the second embodiment of the present invention. In the 3D product forming apparatus 100A of the second embodiment, a cable 26 is provided for transmitting a signal from the sensors of the tank part 21A to the drive controlling part 12.

Figure 11:
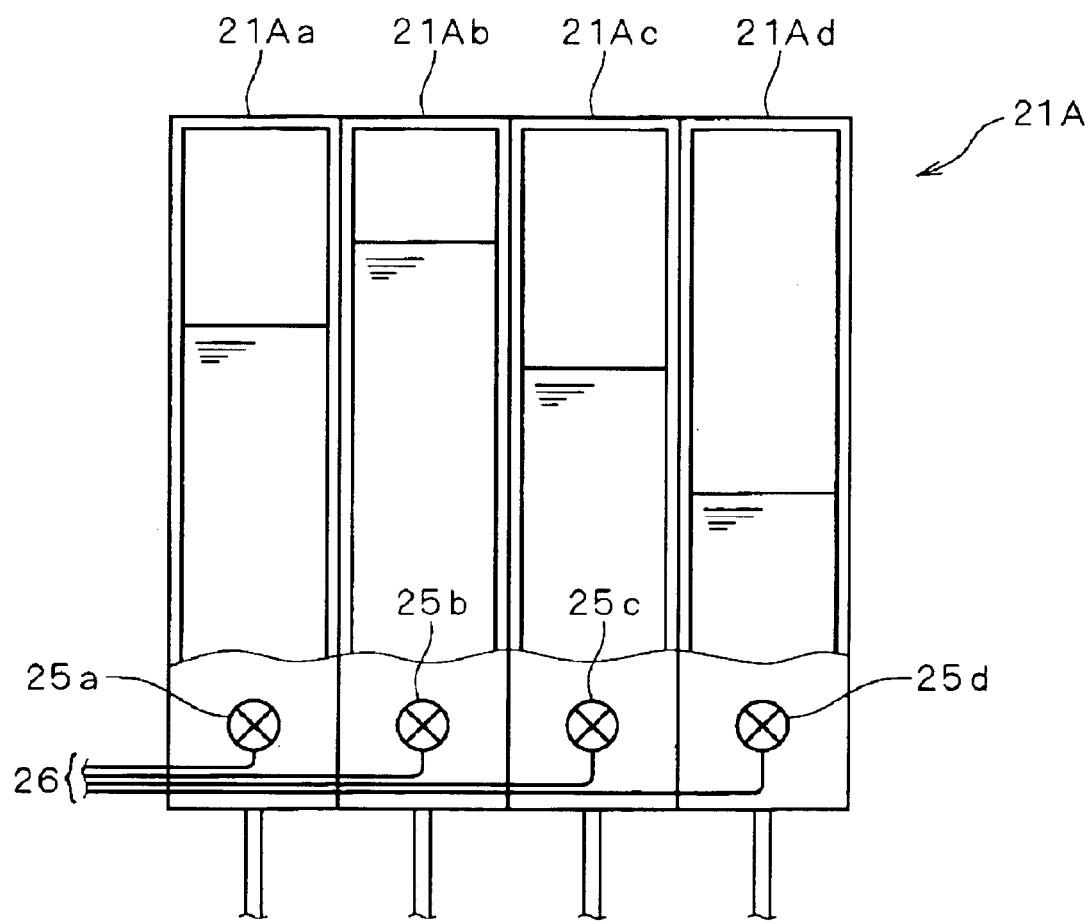
FIG. 11 is a view illustrating a partial cross section of a tank part.

FIG. 11 is a view showing a partial cross section of the tank part 21A. Sensors 25a to 25d corresponding to the tanks 21Aa to 21Ad are disposed at a lower portion of the tank part 21A. The sensors 25a to 25d sense the amounts of the remaining binders in the tanks 21Aa to 21Ad. The sensors 25a to 25d calculate the remaining amounts by sensing the head pressure of the binders accommodated in the tanks 21Aa to 21Ad (the pressure generated at the lower portion of the tank in correspondence with the amount of the binder). Here, as the sensors, one or a plurality of level switches may be vertically disposed in each of the tanks 21Aa to 21Ad. In this case, the construction thereof can be comparatively simplified as compared with the above-mentioned system of sensing the head pressure, although the amount of the remaining binder cannot be sensed continuously.

2-2. Operation of the 3D Product Forming Apparatus

Figure 12:
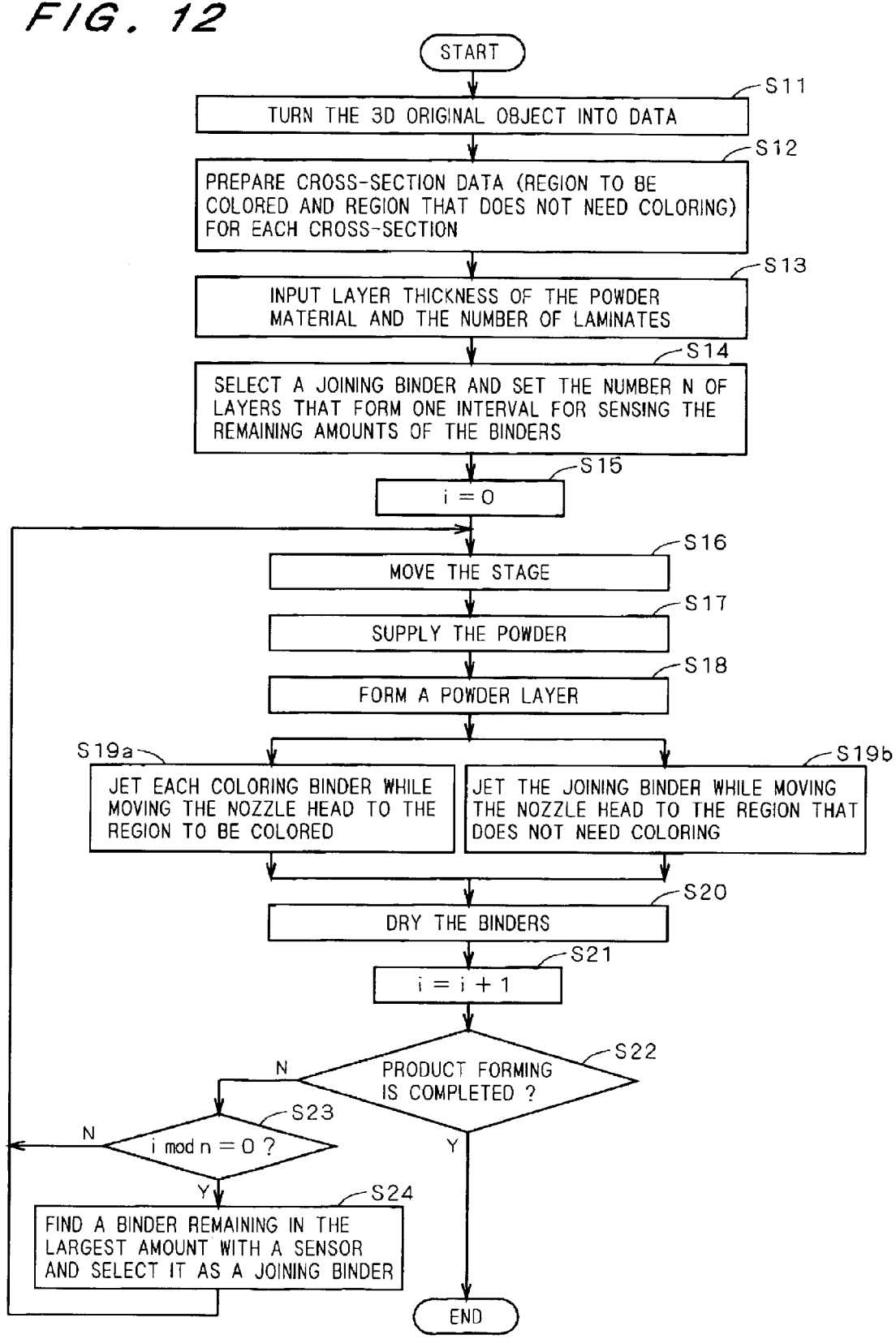
FIG. 12 is a flowchart for describing an overall operation of the 3D product forming apparatus.

FIG. 12 is a flowchart for describing the overall operation of the 3D product forming apparatus 100A. This flowchart is similar to the flowchart shown in FIG. 2; however, operations pertaining to the above-mentioned sensing and control of the amount of the remaining binders are mainly added. Hereafter, the operations different from the flowchart shown in FIG. 2 will be described. Here, the steps S11 to S13, S16 to S18, S20, and S22 correspond to steps S1 to S3, S4 to S6, S8, and S9 of FIG. 2, respectively.

In step S12, a cross section data for each cross section obtained by slicing the 3D original object is prepared from the model data in the same manner as in step S2 of FIG. 2. The data are decomposed to the region to be colored, which appears on the surface of the 3D product and hence needs coloring, and the region that does not need coloring, which corresponds to the inside of the 3D product.

In step S14, a joining binder used only for joining the powder is selected from the four colored binders for the region of the 3D product that does not need coloring. In this case, a specific color, for example, a white binder, may be selected as a default.

Also, the number of powder layers is set as the interval for sensing the amount of the remaining binders in the tanks 21Aa to 21Ad. Since the thickness of one powder layer is small, there will not be a conspicuous difference in the amount of the consumed binders for one powder layer. Therefore, the sensing is facilitated by making the amounts of the remaining binders definite from the accumulated consumption of the binders for n powder layers.

In step S15, 0 (zero) is set as an initial value for counting the number of deposited powder layers that are successively formed on the product forming stage 32.

In steps S19a and S19b, which correspond to the step S7 of FIG. 2, different binders are used for the region to be colored (coloring region) and the region that does not need coloring (non-coloring region) in the cross section data prepared in the step S12. In other words, each colored binder is jetted to the powder layer for the region to be colored, whereas only the selected joining binder is jetted to the region that does not need coloring.

In step S21, the number i of the deposited layers is incremented by one because one layer of the powder bound body has been formed by drying the binder in step S20.

In step S22, if the formation of the 3D product is not completed yet, the procedure goes to the step S23.

In step S23, the drive controlling part 12 judges whether the remainder of the number i of deposited layers as divided by n is zero or not (i.e. whether the number i of the deposited layers is a multiple of n or not). If the remainder is zero, the procedure goes to step S24, whereas if the remainder is not zero, the procedure goes to step S16.

In step S24, the sensors 25a to 25d sense the amounts of the remaining binders in the tanks 21Aa to 21Ad. Then, the binder that is remaining in the largest amount, i.e. the binder that has been least frequently used, is selected as the next binder for joining. For example, in the case shown in FIG. 11, the binder in the tank 21Ab is selected as the next binder for joining because the tank 21Ab accommodates the largest remaining amount of the binder.

Here, the sensors 25a to 25d may issue an alarm to the operator to prompt the replenishment of the tanks 21Aa to 21Ad with the binders if the amount of the remaining binders becomes small.

Through the operations described above, the colored binder that is least frequently used can be preferentially used for joining the inside region that is not related to coloring, whereby the amount of consumption of the colored binders can be made uniform. This makes it possible to effectively utilize the colored binders, and can extend the time interval for replenishing the tanks 21Aa to 21d with the binders.

Further, in the case where only one level switch is disposed in each of the tanks 21Aa to 21Ad, the most preferential binder in a predetermined preferential order (for example, the order of WYMC) can be selected as a binder for joining among the binders that remain in an amount above a predetermined standard level.

In any case, the binder that is remaining in a comparatively large amount is used as the next binder for joining.

3. Third Preferred Embodiment 3-1. Construction of Essential Part of the 3D Product Forming Apparatus The construction of the 3D product forming apparatus of the third embodiment is similar to the 3D product forming apparatus 100 of the first embodiment, except that two blades are provided.

Figure 13:
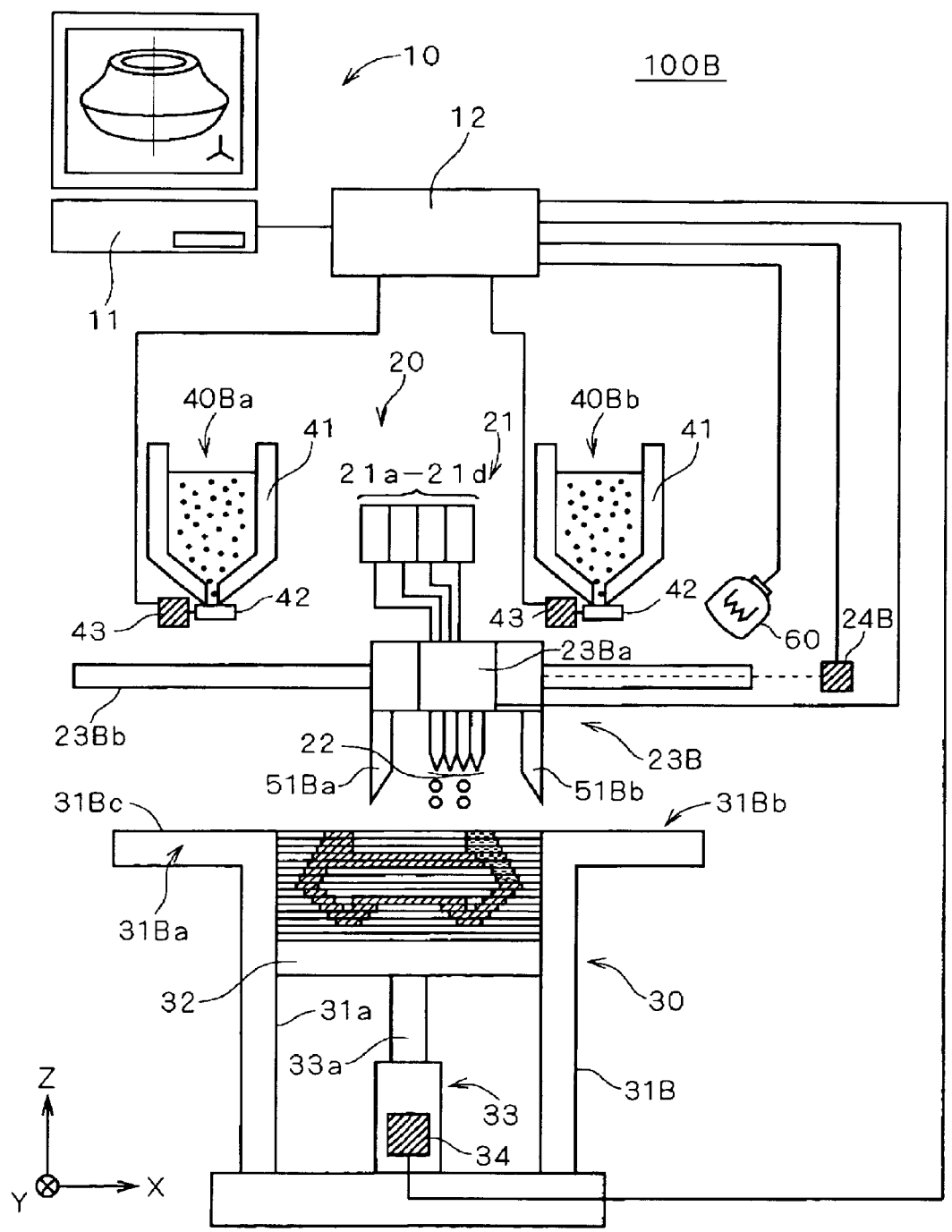
FIG. 13 is a schematic view illustrating a 3D product forming apparatus according to the third embodiment.

FIG. 13 is a schematic view showing a 3D product forming apparatus 100B according to the third embodiment. Two blades 51Ba and 51Bb are disposed on both sides of the XY-direction moving part 23B. The left blade 51Ba and the right blade 51Bb are mirror-symmetric with respect to the YZ-plane.

The driving part 24B for driving the XY-direction moving part 23B serves to drive the above-mentioned two blades independently in the up-and-down direction (Z-direction). On the basis of instructions from the drive controlling part 12, the movement of the nozzle head 22 in the XY-plane and the ascending and descending movement of the blades 51B*a* and 51B*b* in the up-and-down direction are made possible. Here, with respect to the movement of the XY-direction moving part 23B, the right direction of the paper sheet (the direction of increasing X) is referred to as the forward direction, and the left direction of the paper sheet (the direction of decreasing X) is referred to as the backward direction.

Further, the 3D product forming apparatus 100B includes two powder supplying parts 40B*a* and 40B*b*. In accordance therewith, the upper work area of the product forming main body 31B is extended as compared with the 3D product forming apparatus 100 of the first embodiment in order to ensure the provisional powder placing parts 31B*a* and 31B*b* for depositing the powder from the powder supplying parts 40B*a* and 40B*b*.

3-2. Operation of the 3D Product Forming Apparatus

Figure 14:
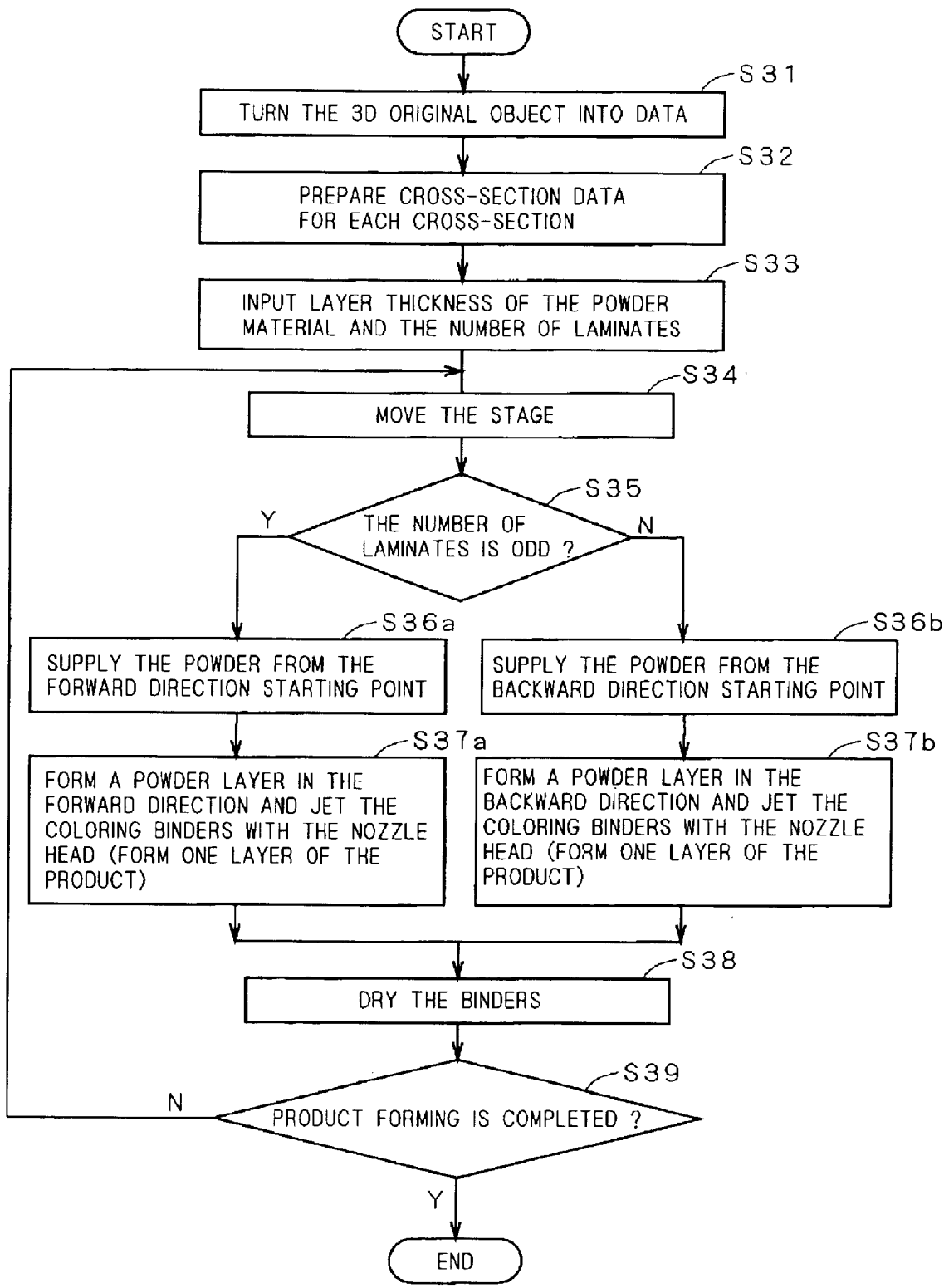
FIG. 14 is a flowchart for describing an overall operation of the 3D product forming apparatus.

FIG. 14 is a flowchart for describing an overall operation of the 3D product forming apparatus 100B. This flowchart is similar to the flowchart shown in FIG. 2; however, operations pertaining to the above-mentioned two kinds of blades 51B*a* and 51B*b* are mainly added. Hereafter, the operations different from the flowchart shown in FIG. 2 will be described. Here, the steps S31 to S34, S38, and S39 correspond to steps S1 to S4, S8, and S9 of FIG. 2, respectively.

In step S35, it judges whether the layer to be deposited next is an odd-numbered layer or not (i.e. whether the number of deposited powder layers will be odd or not). Here, if the number is odd, the procedure goes to the step S36*a*, whereas if the number is even, the procedure goes to the step S36*b*. The overall operation of the 3D product forming apparatus 100B in the subsequent steps will be described with reference to FIGS. 15A to 15D.

Figure 15A:
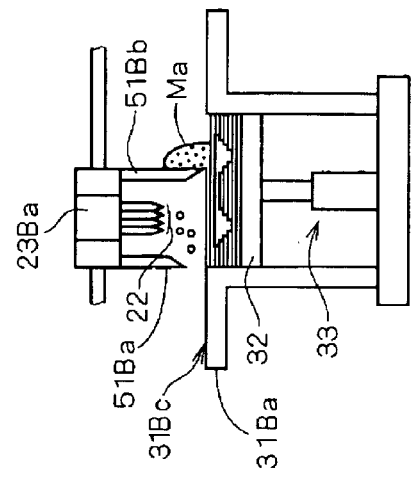
FIGS. 15A to 15D are conceptual views for describing the operation of the 3D product forming apparatus.

In step S36*a*, the powder is supplied from the powder supplying part 40B*a* on the starting point side in the forward direction, i.e. on the left side, as shown in FIG. 15A, thereby to form a heap Ma of the powder material on the left side.

Figure 15B:
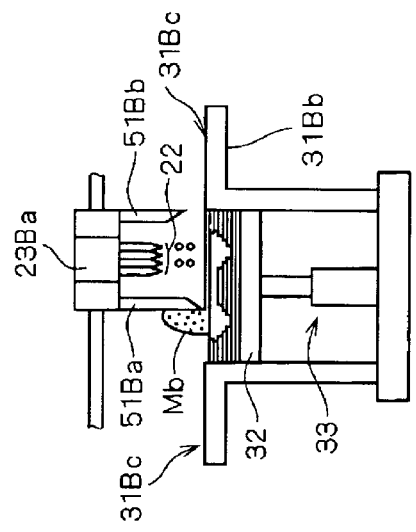

In step S37*a*, the colored binder is jetted by the nozzle head while forming a thin powder layer in the forward direction. Here, first, the XY-direction moving part 23B*a* is moved to the starting point of the forward direction, and the lower tip end of the right blade 51B*b* is lowered to be in contact with the uppermost surface 31B*c* of the provisional powder placing part 31B*a*. Then, as shown in FIG. 15B, the XY-moving part 23B*a* is moved in the forward direction to spread the heap Ma of the powder with the right blade 51B*b*, thereby to form a powder layer. Further, the binders are jetted from the nozzle head 22 located behind the right blade 51B*b* in the moving direction. During these operations, the left blade 51B*a* is in an upward, stand-by position, thereby to prevent the left blade 51B*a* from disturbing the surface of the powder layer after being applied the binders.

Figure 15C:
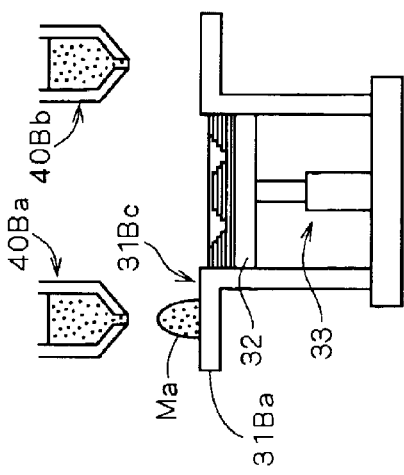

On the other hand, in step S36*b*, the powder is supplied from the powder supplying part 40B*b* on the starting point side in the backward direction, i.e. on the right side, as shown in FIG. 15C, thereby to form a heap Mb of the powder material on the right side.

Figure 15D:
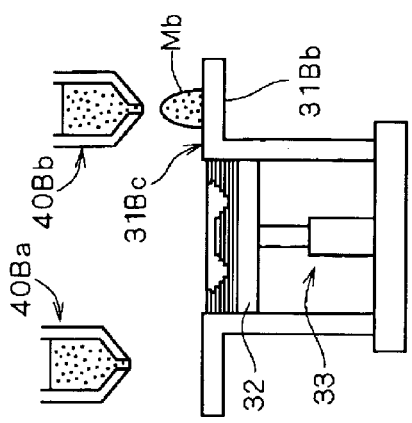

In step S37*b*, the colored binder is jetted by the nozzle head while forming a thin powder layer in the backward direction. Here, first, the XY-direction moving part 23B*a* is moved to the starting point of the backward direction, and the lower tip end of the left blade 51B*a* is lowered to be in contact with the uppermost surface 31B*c* of the provisional powder placing part 31B*b*. Then, as shown in FIG. 15D, the XY-moving part 23B*a* is moved in the backward direction to spread the heap Mb of the powder with the left blade 51B*a*, thereby to form a powder layer. Further, the binders are jetted from the nozzle head 22 located behind the left blade 51B*a* in the moving direction. During these operations, the right blade 51B*b* is in an upward, stand-by position, thereby to prevent the right blade 51B*b* from disturbing the surface of the powder layer after the binders are applied thereto.

By the operations described above, the reciprocal movement of the nozzle head 22 and the blades 51B*a* and 51B*b* in the X-direction can be utilized without loss, whereby the time for returning the blade and the time for returning the nozzle head will be unnecessary. This can shorten the time for forming a thin powder layer and the time for applying the binders to the powder layer. As a result, the 3D product can be formed more quickly. Moreover, since the blades 51B*a* and 51B*b* on both sides are ascended and descended in a complementary manner, disturbance of the product with the blade can be especially effectively prevented.

4. Fourth Preferred Embodiment

Figure 16:
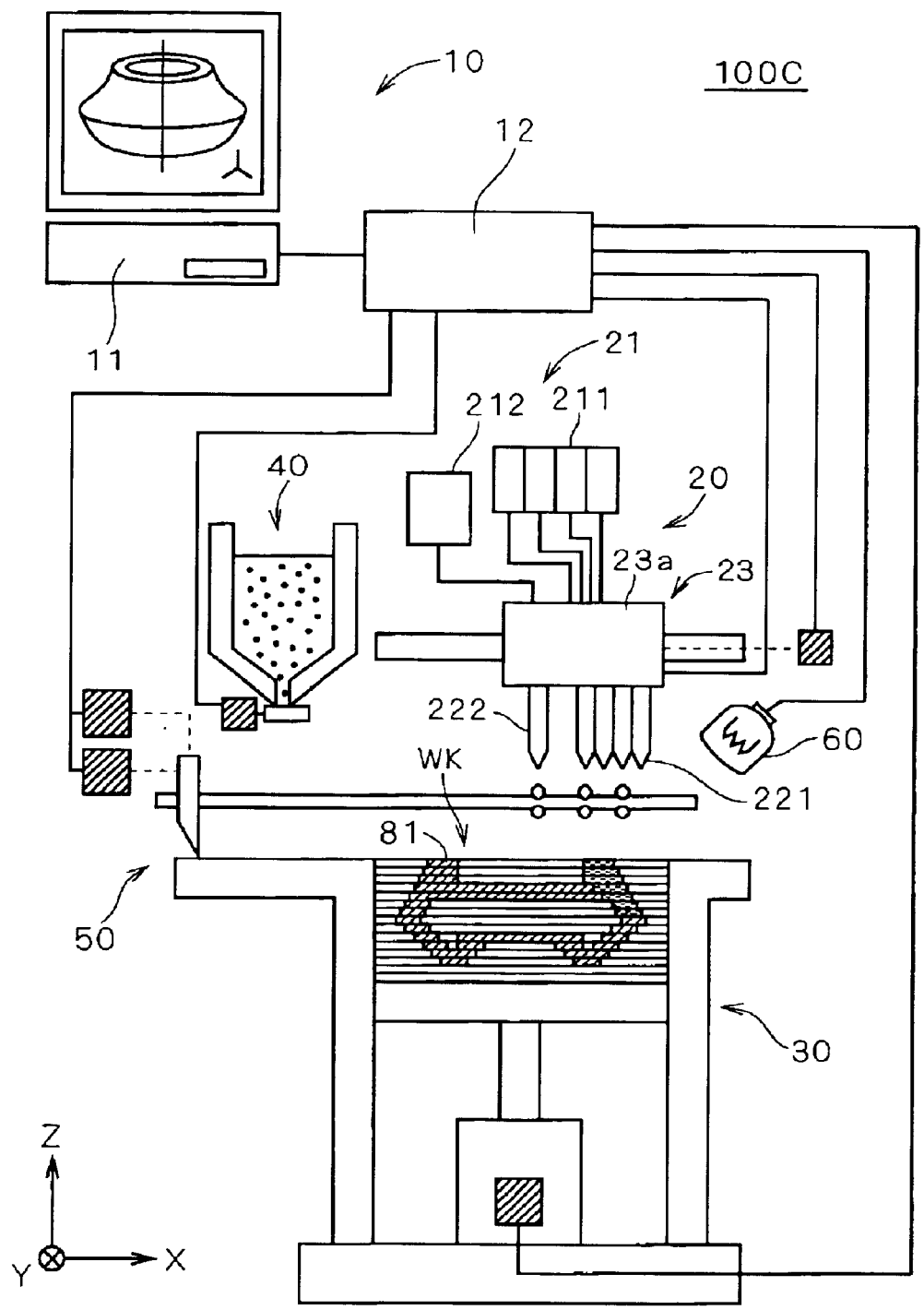
FIG. 16 is a schematic view illustrating a 3D product forming apparatus according to the fourth embodiment.

FIG. 16 is a view showing a construction of a 3D product forming apparatus 100C according to the fourth embodiment of the present invention. In the 3D product forming apparatus 100C according to the fourth embodiment, the ink and the binders are jetted separately, and the construction is different from the one shown in FIG. 1, the only difference lying in that the moving part main body 23*a* includes a nozzle head 221 for ink and a nozzle head 222 for binders, and the tank part 21 includes a tank 211 for ink and a tank 212 for binders. Here, in FIG. 16, only the principal constructions are denoted with reference numerals similar to those of the first embodiment.

The tank 211 and the nozzle head 221 for ink are separated for each color of the ink (for example, each color of CMYK). The ink corresponding to the black color (K) is used in the case where one wishes to vividly generate the black color, and if the powder material is not in vivid white, ink of white color (W) may be further used.

The operation of the 3D product forming apparatus 100C according to the fourth embodiment is basically the same as that of the first embodiment, and is similar to the flow of the operations in FIG. 2. However, the operation of step S7 is different in that the ink and the binders are jetted separately. FIG. 17 is a flowchart showing the flow of operations of the step S7 in the fourth embodiment.

When one thin powder layer is formed (FIG. 2: steps S4 to S6), first, the ink is jetted from the nozzle head 221 for ink in accordance with the color data generated in the step S2 (step S71). The jetting of the ink is carried out selectively in accordance with the color to be imparted in the same manner as the jetting of the colored binders in the first embodiment. Subsequently, a colorless and transparent binder is jetted from the nozzle head 222 for binders in accordance with the configuration data (step S72).

By these operations, ink is applied to the region to be colored of each layer exemplified in FIG. 6A, and a colorless and transparent binder is applied to the region to be colored and the region that does not need coloring, i.e. the region corresponding to one cross section of the 3D product. Here, after the ink is applied, the binders are applied by jetting the ink and the binders in parallel while moving the moving part main body 23*a* to the right side (the nozzle head 221 side) in FIG. 16.

Thereafter, the binders are dried (FIG. 2: step S8), thereby to complete the formation of the powder bound body 81 in one powder layer in the same manner as in the first embodiment.

Then, by repeating the steps S4 to S8, the 3D product is created in the space WK where the formation of 3D products is carried out (step S9).

In the 3D product forming apparatus 100C, the ink is jetted before the binders are jetted. This is due to two reasons. One reason is to prevent blurring of the ink caused by jetting the ink immediately after the binders are jetted. Generally, the period of time required from jetting ink until the ink is dried and stably fixed is shorter than the period of time required from jetting the binders until the binders are dried (or hardened) and brought into a stable state. For example, a fast-drying ink is provided in many cases as an ink for printers of ink jet type that print on a paper sheet.

For this reason, if the ink is jetted immediately after the binders are jetted, the ink is imparted onto the binders before the binders are stabilized, thereby blurring and mixing the colors. As a result, the reproducibility or the resolution of colors is deteriorated, thereby failing to provide a 3D product in a desired colored state. Further, by mixing of the binders with ink, the area where the powders are bound with each other will be widened, thereby deteriorating the configuration precision.

Needless to say, one can consider a system in which the ink is jetted after waiting for a while till the binders are dried or hardened. In this case, however, the period of time required in forming a powder bound body for one layer will be long. Referring to FIG. 16, in the case where the nozzle head 221 for ink and the nozzle head 222 for binders are fixed to the moving part main body 23a, the ink and the binders can be successively applied to the powder layer by simultaneously jetting the ink and the binders while moving the moving part main body 23a to the right side (nozzle head 221 side) shown in FIG. 16. In other words, applying the ink and the binders is completed simply by passing the moving part main body 23a only once over an arbitrary region on the powder layer.

However, if the binders are to be applied to the powder layer before the ink, the ink must be applied after the binders are applied to the powder layer once and then the binders are dried and hardened. In this case, the moving part main body 23a must be passed twice over an arbitrary region on the powder layer. As a result, the period of time required in forming a powder bound body for one layer will be long. Here, even if the nozzle head 221 for ink and the nozzle head 222 for binders are independently movable, the ink and the binders can be applied while simultaneously moving the two nozzle heads 221 and 222 by jetting the ink first, whereby the 3D product can be formed more quickly than in the case of jetting the binders first.

Also, even in the case of individually jetting different inks, the inks can be quickly applied while preventing the blurring of the colors by jetting a quick-drying ink first and then jetting the non-quick-drying ink later, in the same manner as in the above-mentioned relationship of the ink and the binders.

Thus, a suitably colored (or suitably configured) 3D product can be created quickly by applying a material that requires a shorter period of time for stabilization after application (i.e. material that is more quickly dried or hardened) first in applying plural kinds of materials (plural kinds of inks or plural kinds of binders) to a powder layer.

The other reason for applying the ink first and then applying the binders later is that, if the binders are applied first and the ink is applied after the binders are stabilized, the ink does not penetrate into the powder layer, thereby making it difficult to perform suitable coloring. In this case, the ink adheres only to the surface of the stabilized binders and the inside of the powder layer is not colored. As a result, when the completed 3D product is cut, the coloring in the cross section will be unsuitable. Here, the jetting of the binder is not limited to the mode in which the binder is jetted from one nozzle to one region on the powder layer, but may be a mode in which the binders are constructed with plural kinds of materials and the materials constituting the binders are jetted from plural nozzles to one region on the powder layer, as in the case of a two-liquid type adhesive of an epoxy system or an adhesive imparted with a hardening promoting agent.

As described above, in the 3D product forming apparatus 100C according to the fourth embodiment, a 3D product in which the color and the configuration thereof are suitably reproduced can be formed quickly by applying the ink, which is a material that requires a shorter period of time for stabilization after being applied to the powder layer, before the binders are applied.

5. Fifth Preferred Embodiment

In the above-mentioned embodiments, a material having a different color is supplied from each nozzle. However, it is possible to adopt a construction in which plural kinds of materials (binding agents) that each provide a different sense of mass (including feel of surface and hardness) of the product are jetted from the respective nozzles irrespective of the colors.

Among these, examples of a plurality of binding agents having different senses of mass are:

(1) a combination of a binder having a luster and a binder having no luster, (2) a combination of a binder visually having a particulate property and a binder that is visually smooth, (3) a combination of a binder comparatively having transparency and a non-transparent binder, (4) a combination of a binder being imparted with a metal luster and a binder having no metal luster, and composite combinations thereof.

Further, with respect to hardness, an elastic material may be used as well instead of simply using plural kinds of materials having different hardnesses. This makes it possible to integrally form a 3D product partially having elasticity by using a binder having elasticity on the gripping part in creating a proto-product of a product having a rubber attached to the gripping part thereof, with a 3D product forming apparatus.

As described above, a more complex product can be suitably fabricated by applying plural kinds of materials that affect not only the color but also the sense of mass, to the powder layer.

6. Sixth Preferred Embodiment

Next, a case in which a thermoplastic material is used as the powder material for forming a 3D product will be described. Here, utilization of a thermoplastic material is possible in any of the aforementioned embodiments 1 to 5, and a 3D product formed with a thermoplastic powder material can be produced by repeating the steps of forming a powder layer and applying the binders. Further, in the following descriptions, the descriptions will be made by suitably attaching reference numerals used in the previous embodiments.

If a thermoplastic powder material is used, the powder particles can be bonded to each other to improve the strength of the 3D product by heating the 3D product that has completed the formation.

FIG. 18 is a flowchart that shows a flow of post-processes after the formation (for example, after the forming operations shown in FIGS. 2, 12, and 14 are carried out) in the case of utilizing a thermoplastic powder material. When the bonding of the powder layers with the binders is completed up to the final powder layer, the 3D product is left to stand until the strength of the binders is enhanced to such a degree that the 3D product can be taken out. When the strength of the binders is sufficiently enhanced, the 3D product is taken out by the operator from the powder in the space WK where the formation of 3D products is carried out, and the unnecessary powder adhering around the 3D product is removed (step S101). At this time, the powder adhering to the surroundings or intricate portions of the 3D product is removed by giving vibration or giving high speed air stream to the 3D product.

Subsequently, the 3D product is transported to a fixing apparatus, where the 3D product is heated above the temperature at which the thermoplastic material is softened, thereby fixing the powder (this refers to a process of enhancing the binding strength of the powders with each other) (steps S102, S103). Through this process, the strength of the 3D product can be easily improved.

Figure 19:
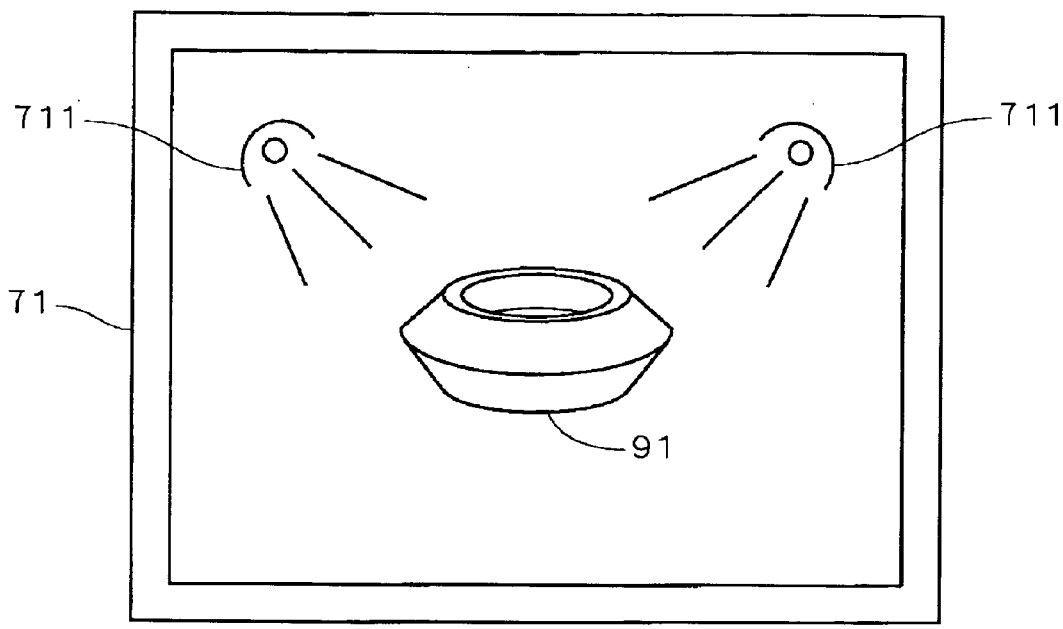
FIG. 19 is a view showing an example of an internal construction of a fixing apparatus.

FIG. 19 is a view showing a construction of a fixing apparatus 71. The inside of the fixing apparatus 71 shown in FIG. 19 is a space where a heating treatment is carried out, and is equipped with a lamp 711 for radiating a flash light to the 3D product 91 transported into the fixing apparatus 71. As the lamp 711, a lamp emitting light that can be easily transformed into heat energy, such as an infrared lamp, a xenon lamp, or a halogen lamp, is used.

When the light from the lamp 711 is radiated to the 3D product 91, the thermoplastic powder material absorbs light energy on the surface of the 3D product 91, whereby the temperature rises. As a result, the powders are bound (or welded) with each other on the surface of the 3D product 91. Thereafter, the lamp 711 is deenergized (turned off) to harden and bind the powder firmly on the surface, thereby improving the strength of the 3D product 91. If a lamp is used for heating the 3D product 91, fixation of the 3D product 91 can be easily carried out simply by controlling the energization of the lamp.

Figure 20:
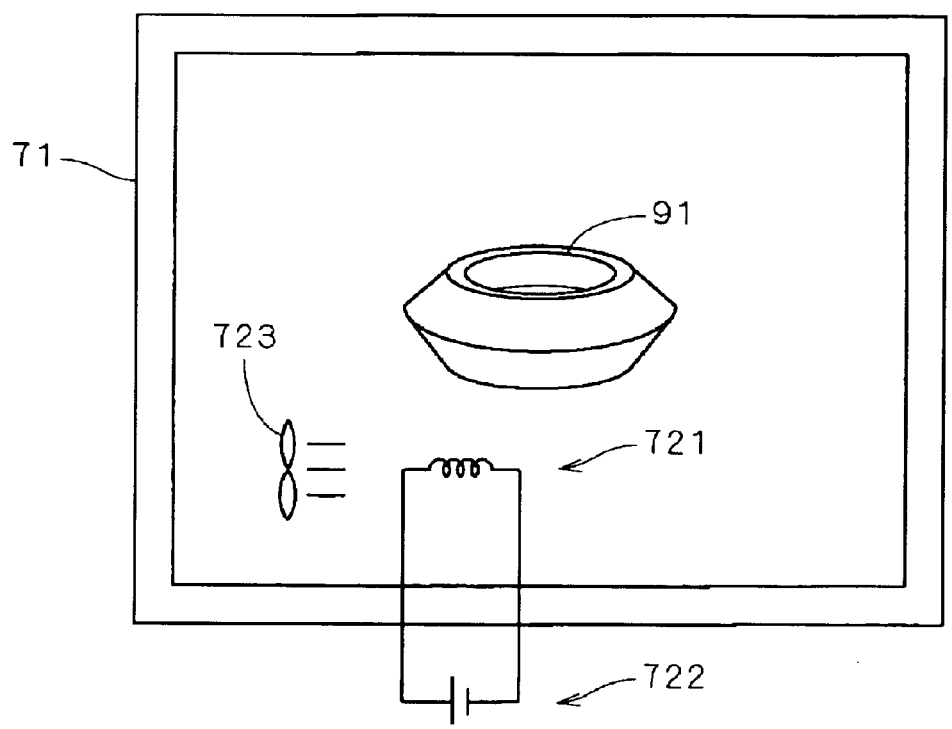
FIG. 20 is a view showing another example of an internal construction of a fixing apparatus.

FIG. 20 is a view showing another construction of a fixing apparatus 71. The inside of the fixing apparatus 71 shown in FIG. 20 is a space where a heating treatment is carried out, and the inside space is equipped with a heater 721 and a fan 723. Electric power is supplied to the heater 721 by a power source 722. In other words, the fixing apparatus 71 is a so-called oven, where the 3D product 91 is heated by heating air in the inside space. Also, in the case of the fixing apparatus 71 shown in FIG. 20, the heating is controlled so as to allow the powders on the surface of the 3D product 91 to be bound (or welded) with each other, and thereafter the heating is stopped (or cooling is carried out) to harden the thermoplastic resin, whereby the strength of the 3D product 91 is enhanced. Here, in performing the heating treatment, pressurization may also be carried out.

Figure 21:
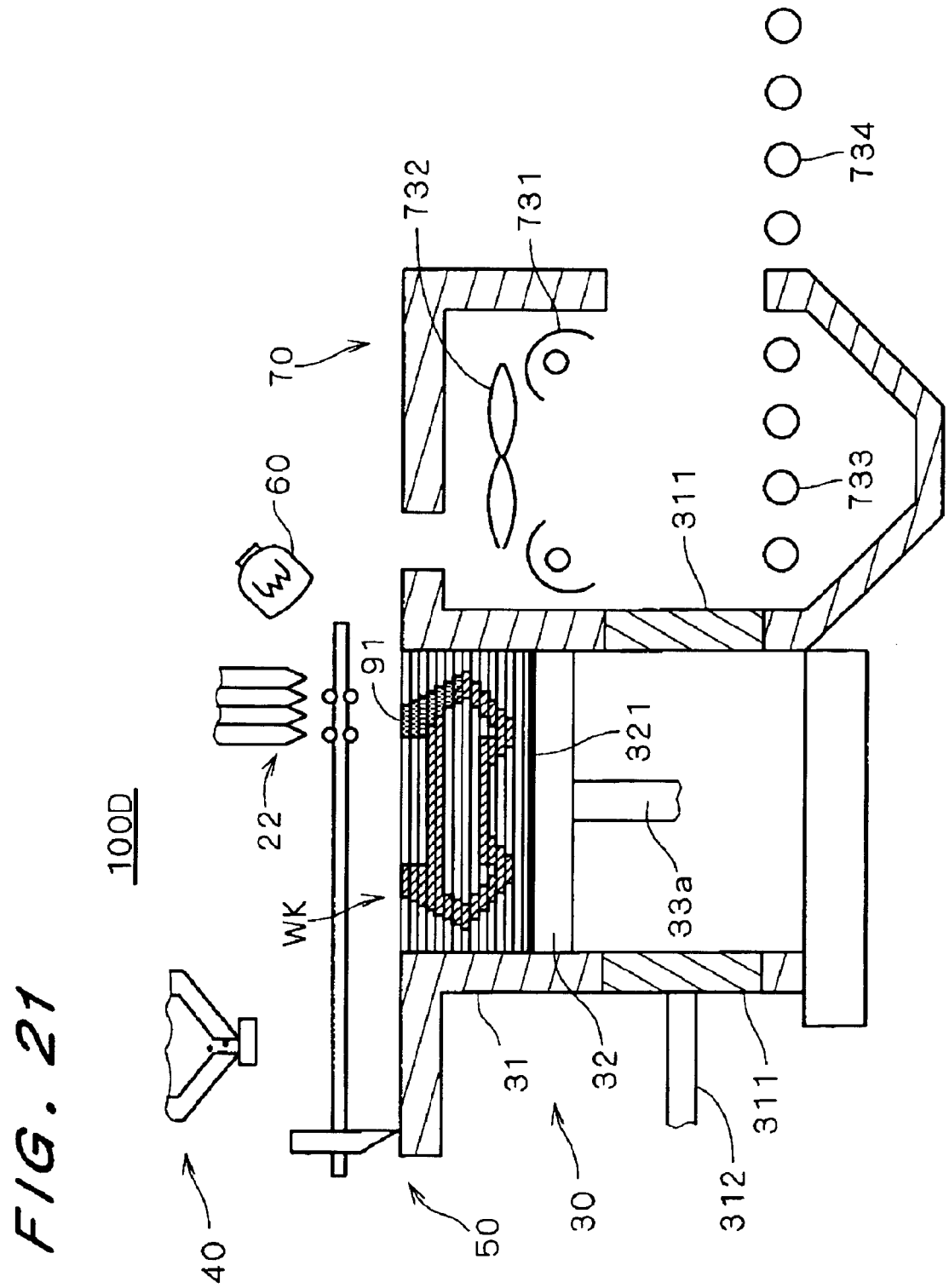
FIG. 21 is a view illustrating a part of a 3D product forming apparatus having a fixing part.

FIG. 21 is a view exemplifying a manner in which the construction of automatically performing the fixation of the 3D product is added to the 3D product forming apparatus according to the first embodiment. Here, in FIG. 21, since the upper part of the 3D product forming apparatus 100D is similar to that of the first embodiment, illustration thereof is suitably omitted.

In the 3D product forming apparatus 100D, a fixing part 70 is disposed on a lateral side of the product forming part 30, and a part of the side wall of the product forming part main body 31 (tubular portion) is made into a movable side wall 311. The movable side wall 311 is connected to a cylinder via a shaft 312, and is movable in the horizontal direction by driving the cylinder. Further, a porous plate 321 such as a metal net is disposed on the product forming stage 32.

The inside of the fixing part 70 is equipped with a lamp 731 for radiating a flash light to the 3D product and a fan 732 for removing the unnecessary powder adhering to the 3D product. A guide roller 733 for guiding the 3D product is disposed at a lower part of the inside of the fixing part 70, and the guide roller 733 is linked to a guide roller 734 on the outside of the fixing part 70.

Figure 22:
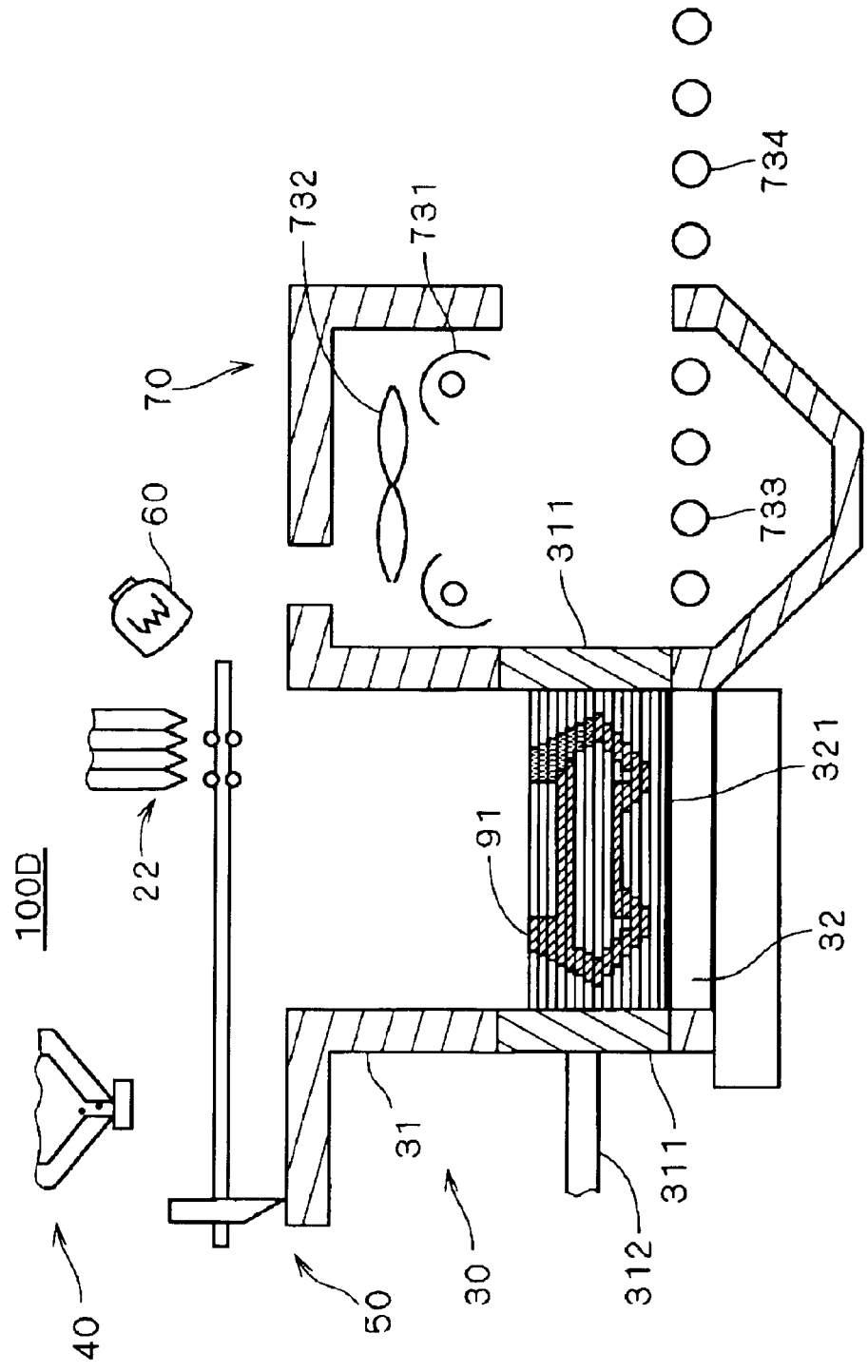
FIGS. 22 to 24 are views illustrating how the 3D product forming apparatus shown in FIG. 21 operates.
Figure 23:
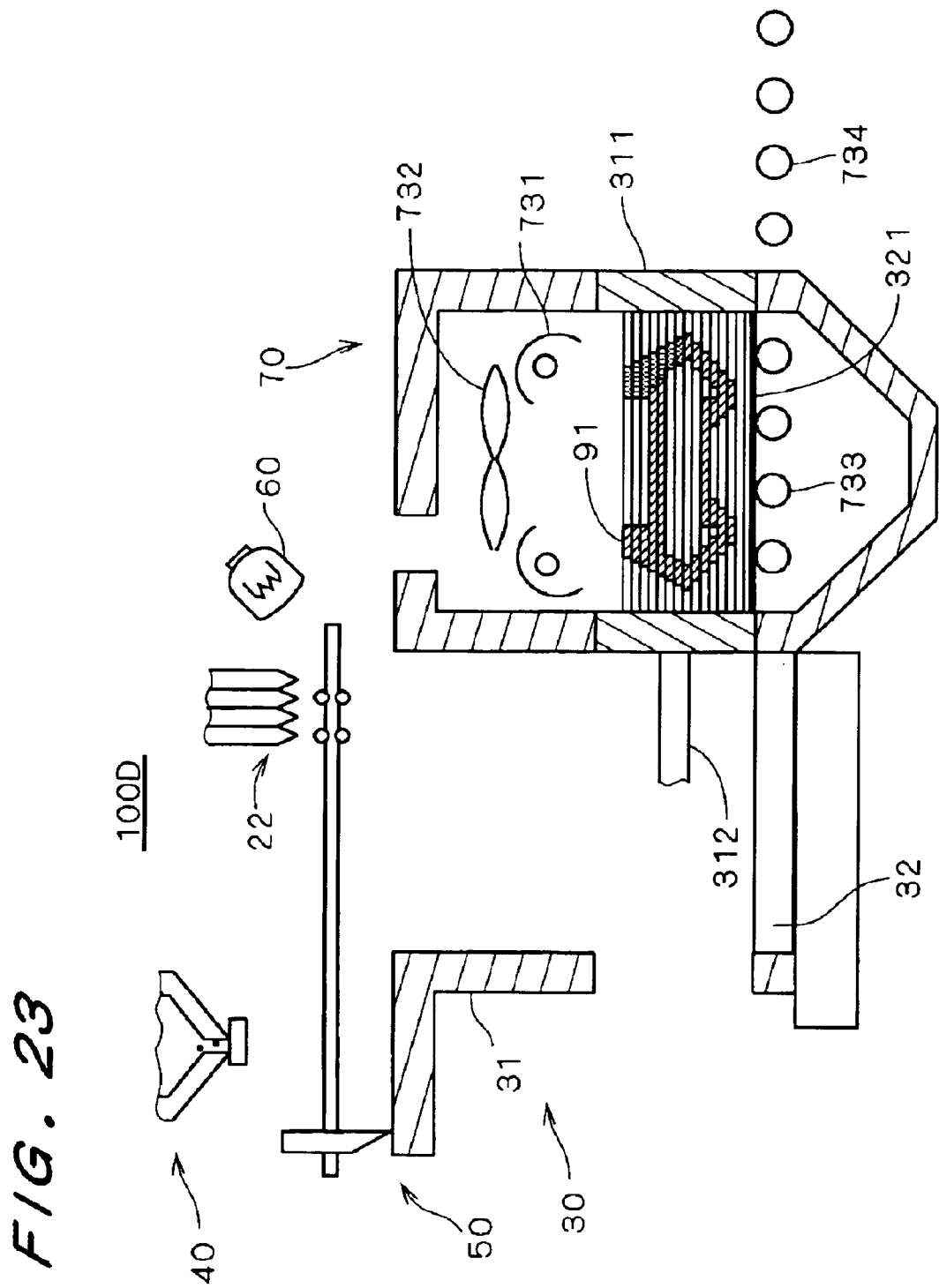

When the whole of the 3D product 91 is formed in the same manner as in the first embodiment in the space WK where 3D products are formed, the product forming stage 32 descends from the state shown in FIG. 21 by a supporting rod 33a as shown in FIG. 22, and the 3D product 91 stops at a position where it is surrounded by the moving side walls 311. Then, the moving side walls 311 are pushed by the shaft 312 as shown in FIG. 23 to move to the fixing part 70. This allows the 3D product 91 and the surrounding powder to be transported to the inside of the fixing part 70 together with the porous plate 321 while being guided by the guide roller 733.

When the 3D product 91 and the surrounding powder are transported to the fixing part 70, the surrounding powder drops downward from the pores of the porous plate 321. Further, the fan 732 removes the powder adhering to the 3D product 91. Here, in order to suitably remove the unnecessary powder, the guide roller 733 and the moving side walls 311 may be vibrated.

Figure 24:
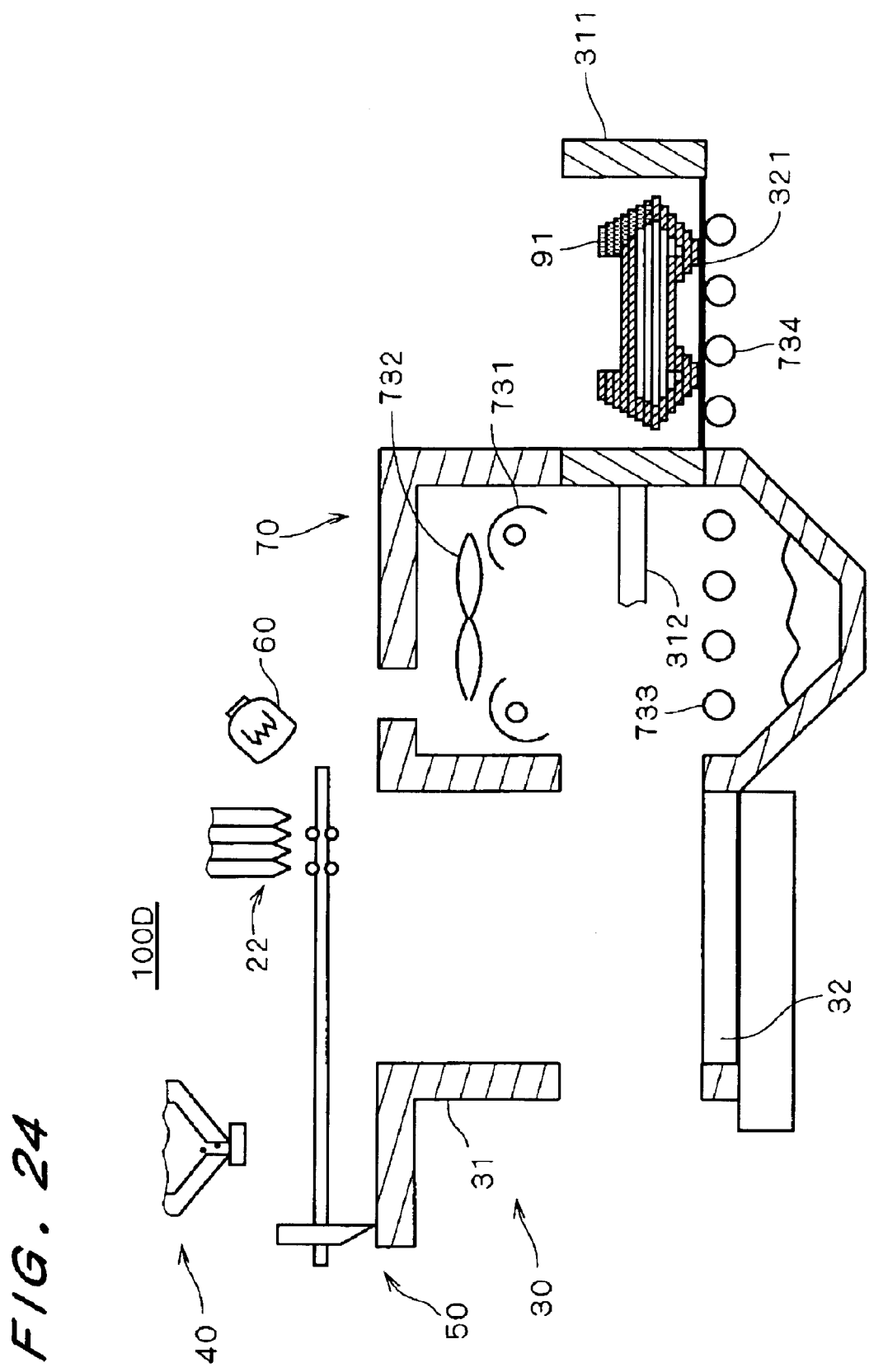

When the removal of the unnecessary powder is completed, the lamp 731 is energized and controlled to fix the thermoplastic powder constituting the surface of the 3D product as described before. In other words, after the powder is softened and bound, the powder is cooled and hardened. This enhances the strength of the 3D product. After the fixing step is completed, the movable side walls 311 move further as shown in FIG. 24, whereby the 3D product 91 is transported onto the guide roller 734 together with the porous plate 321.

When the completed 3D product 91 is taken out from the movable side walls 311, the movable side walls 311 return to the product forming part 30 together with the porous plate 321, and the procedure returns to the first stage of creating a 3D product.

Here, the fixing part 70 may be an oven type shown in FIG. 20, and the product forming part 30 and the fixing part 70 may be separate. If the 3D product 91 is to be transported automatically from the product forming part 30 to the fixing part 70, any other mechanism may be adopted. Further, the technique of forming a 3D product with the use of a thermoplastic powder material and enhancing the strength of the 3D product by heating can be utilized in any mode in which 3D products are formed with powder.

Next, the thermoplastic material to be used as the powder material will be described. As the thermoplastic material, a resin (such as thermoplastic plastic or thermoplastic rubber) or a metal is adopted. Needless to say, other materials may be used if they have thermoplasticity. Here, the color generation of the 3D product can be improved by using a white powder, and the color of the powder can be prevented from being an obstacle to coloring by using a colorless and transparent powder. In other words, by using a white powder or a colorless and transparent powder, a suitable color reproduction can be realized. This applies to the first to fourth embodiments as well.

As the thermoplastic resin, there are many kinds such as polyolefin, polystyrene, ABS, polyvinyl chloride, methacrylic resin, polyacrylate, acrylic rubber, polyester-based thermoplastic elastomer, polyurethane elastomer, styrene-based thermoplastic elastomer, isoprene-based thermoplastic elastomer, olefin-based thermoplastic elastomer, polycarbonate, polyester, and polyimide. Also, by utilizing thermoplastic rubbers or elastomers, a 3D product having elasticity can be produced.

As the thermoplastic metal, a low-melting-point solder, a U-alloy (Bi—Pb—Sn—Cd—In alloy), and others can be used.

Here, in the case of utilizing a thermoplastic resin, the powder can be easily turned into white, and also a suitable coloring can be easily carried out.

Here, a general-purpose toner for electrophotography such as used in a copier or a printer of electronic printing type can be utilized as the thermoplastic material. The toner for electronic printing (hereafter referred to as "toner") contains a thermoplastic resin as a major component, is easily available, and has a uniform particle size, so that the toner is a suitable material for forming a 3D product with powder.

The toner is constructed mainly with a resin, an internal additive added to the inside of the particles, and an external additive added to the outside of the particles. Generally, the resin occupying 95% as a component of the toner, is polyester or styrene acryl. Further, an organic metal compound as an internal additive of the resin powder, a pigment such as carbon, an organic metal compound as an electric charge controlling agent, and wax such as polyethylene, polypropylene, and natural wax as a lubricant are dispersed in several percents in the resin powder. Further, silicon oxide, titanium oxide, strontium oxide, calcium stearate, or the like is fixed in several percents on the surface of the particles as an external additive.

Further, the adhesive to be contained in the binders in the case of using a toner may be, for example, a polyester-based adhesive, an acrylic-resin-based adhesive, a cyanoacrylate-based adhesive, and others, and can be jetted in an ink jet type if it is an adhesive of an aqueous emulsion type. As the technique for fixing the toner, the above-mentioned flash system (lamp system) or an oven system can be utilized.

As described above, by using toner as a powder material, the thermoplastic powder is available easily and at a low cost.

7. Modified Examples

For coloring, three primary colors of light consisting of R (red), G (green), and B (blue) may be used.

For colored binders, it is not essential that the binders are provided in four kinds of colors, and they may be provided in five kinds of colors consisting of three primary colors, a white color, and a colorless and transparent color, or may be provided in six kinds of colors.

For a jetting nozzle, it is possible to adopt a construction in which the binders of different colors accommodated in the tanks are mixed before being jetted and are then jetted.

For the color of the powder, it is not essential that the powder is white, and may be colored in blue or yellow, or may be colorless and transparent such as in glass powder.

For formation of the powder layer, it is not essential to use a blade, and it is possible to use a roller or the like.

In the third embodiment, the blades on both sides are represented as "right and left"; however, the relationship is relative, and even in the case of an apparatus in which the blade and others are moved in the forward and backward directions to spread the powder, the moving direction is the left-and-right direction when the apparatus is turned by 90°. Therefore, without loss of generality, the moving direction can be called "right-and-left" direction.

In the third embodiment, the blade on the side of forming a powder layer is lowered and the other blade is raised in forming the powder layer effectively by using two blades; however, the other blade need not be raised if a condition is satisfied such that the other blade does not affect the powder layer because of the property of the powder material or the property of the binder material.

In the aforesaid embodiments, the nozzle head is allowed to scan only the region where the configuration data exist; however, it is possible to adopt a construction in which the movement of the nozzle head performs raster scan of the whole work area of the product forming part main body. In this case, the configuration data is not necessary, and a construction is adopted such that only the coloring data is prepared as the cross section data (i.e. the coloring data serves as the configuration data as well).

In the aforesaid first to third embodiments, each color is allowed to have a binder function; however, one (preferably white) of the plurality of colors may be provided in a binder, and the other colors may be provided in ink that does not have a binder function. In other words, it is sufficient that at least one kind of a binder (a binding agent or a material that contains a binding agent) applied to the powder layer exists, and the fourth embodiment is an example in which one kind of a colorless and transparent binder is used.

While the invention has been shown and described in detail, the foregoing description is in all aspects illustrative and not restrictive. It is therefore understood that numerous other modifications and variations can be devised without departing from the scope of the invention.

What is claimed is:

1. An apparatus for forming a three-dimensional product by applying binder to powder material to form bound bodies successively, said bound bodies corresponding to sectional data blocks which are produced by slicing an original object with parallel planes, said apparatus comprising:

a layer forming mechanism for forming a layer of said powder material;

an applying head for applying plural kinds of materials to said layers, said plural kinds of materials including at least one kind of binder; and a controller for controlling said applying head to apply said plural kinds of materials selectively to a predetermined region on said layer, wherein said applying head applies a plurality of binders to said predetermined region, said plurality of binders having different colors from one another, said predetermined region is include a coloring region and non-coloring region, and said powder material is bound with said plurality of binders selectively in said coloring region and with one of said plurality of binders in said non-coloring region said apparatus further comprising:

a plurality of tanks for containing said plurality of binders and supplying said plurality of binders to said applying head; and detectors for detecting an amount of each of said plurality of binders remaining in each said plurality of tanks, wherein the controller controls said applying head to apply a binder which has the greatest remaining amount to said non-coloring region.

2. An apparatus for forming a three-dimensional product by applying binder to powder material to form bound bodies successively, said bound bodies corresponding to sectional data blocks which are produced by slicing an original object with parallel planes, said apparatus comprising:

a layer forming mechanism for forming a layer of said powder material;

an applying head for applying plural kinds of materials to said layers, said plural kinds of materials including at least one kind of binder; and a controller for controlling said applying head to apply said plural kinds of materials selectively to a predetermined region on said layer, wherein said layer forming mechanism comprises:

powder supplier for forming a left-side heap and a right-side heap of said powder material on left and right sides of a space where said three-dimensional product is formed; and a left-side powder spreading member and a right-side powder spreading member provided on left and right sides of said applying head, respectively, in case of moving said applying head from left to right, said right-side powder spreading member spreads said left-side heap to right direction to form a layer of said powder material, and in case of moving said applying head from right to left, said left-side powder spreading member spreads said right-side heap to left direction to form a layer of said powder material.

3. The apparatus of claim 2, wherein said right-side powder spreading member and said left-side powder spreading member move up and down alternately, and while one powder spreading member is forming a layer of said powder material, another spreading member retreats upward.

* * * * *